US011178304B2

United States Patent
Kamio et al.

(10) Patent No.: US 11,178,304 B2
(45) Date of Patent: Nov. 16, 2021

(54) IMAGE READING APPARATUS, CONTROL METHOD THEREOF, AND STORAGE MEDIUM

(71) Applicant: CANON KABUSHIKI KAISHA, Tokyo (JP)

(72) Inventors: Yuki Kamio, Kawasaki (JP); Katsutoshi Miyahara, Kawasaki (JP); Yuichi Sato, Kanagawa (JP); Takahiro Ode, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/030,957

(22) Filed: Sep. 24, 2020

(65) Prior Publication Data

US 2021/0112174 A1 Apr. 15, 2021

(30) Foreign Application Priority Data

Oct. 9, 2019 (JP) .............................. JP2019-185971

(51) Int. Cl.
*H04N 1/00* (2006.01)
*H04N 1/047* (2006.01)
*H04N 1/03* (2006.01)

(52) U.S. Cl.
CPC ......... *H04N 1/047* (2013.01); *H04N 1/00045* (2013.01); *H04N 1/00068* (2013.01); *H04N 1/03* (2013.01)

(58) Field of Classification Search
CPC .. H04N 1/047; H04N 1/00045; H04N 1/0068; H04N 1/03
USPC .......................... 358/1.1, 1.15, 474, 464, 406
See application file for complete search history.

(56) References Cited

U.S. PATENT DOCUMENTS

| 5,101,096 | A  | * | 3/1992 | Ohyama | .................. G06K 1/14 235/436 |
| 2003/0194143 | A1 | * | 10/2003 | Iida | ........................ H04N 5/217 382/241 |
| 2009/0129804 | A1 | * | 5/2009 | Shoji | ..................... G03G 15/043 399/72 |
| 2011/0216379 | A1 | * | 9/2011 | Arakawa | .................. H04N 1/04 358/488 |
| 2016/0170354 | A1 | * | 6/2016 | Mizawa | ............. G03G 15/5041 399/72 |

FOREIGN PATENT DOCUMENTS

| JP | 2003-250015 | 9/2003 |
| JP | 2007-304653 | 11/2007 |

\* cited by examiner

*Primary Examiner* — Gabriel I Garcia
(74) *Attorney, Agent, or Firm* — Venable LLP

(57) ABSTRACT

An object of one embodiment of the present invention is to accurately derive an inclination of a line image sensor. One embodiment of the present invention is an image reading apparatus including: a line image sensor in which reading elements for reading an image are arrayed in a predetermined direction; a first derivation unit configured to, based on read data acquired by reading a chart on which a plurality of dot patterns is printed with the line image sensor, derive coordinates of each of the plurality of dot patterns; a second derivation unit configured to derive an inclination angle of the line image sensor based on the coordinates derived by the first derivation unit; and a first calculation unit configured to calculate a first correction value for correcting the inclination of the line image sensor based on the inclination angle derived by the second derivation unit.

24 Claims, 33 Drawing Sheets

SUM OF EACH COORDINATE $\sum_{p=0}^{N-1} Xp = \sum_{p=0}^{N-1} Yp = \sum_{p=0}^{N-1} Xp * Yp = 0$ .....(1)

$$Xi = \frac{1}{\cos \varphi} * Xp$$ .....(2)

$$Yi = \tan \varphi * Xp + \mu * Yp$$ .....(3)

$$Xi * Yi = \frac{\sin \varphi}{(\cos \varphi)^2} * Xp^2 + \frac{\mu}{\cos \varphi} Xp * Yp$$ .....(4)

$$Xi^2 = \frac{1}{(\cos \varphi)^2} * Xp^2$$ .....(5)

REGRESSION LINE WITH REFERENCE POINT AS CENTER $Y = aX + b$ $$a = \frac{N \sum_{p=0}^{N-1} Xi * Yi - \sum_{p=0}^{N-1} Xi * \sum_{p=0}^{N-1} Yi}{N \sum_{p=0}^{N-1} Xi^2 - (\sum_{p=0}^{N-1} Xi)^2} \qquad b = \frac{\sum_{p=0}^{N-1} Yi - a \sum_{p=0}^{N-1} Xi}{N}$$ .....(6)

$$\sum_{p=0}^{N-1} Xi = \sum_{p=0}^{N-1} \frac{1}{\cos \varphi} * \sum_{p=0}^{N-1} Xm = \frac{1}{\cos \varphi} * Xp = 0$$ .....(7)

$$\sum_{p=0}^{N-1} Yi = \tan \varphi * \sum_{p=0}^{N-1} Xp + \mu * \sum_{p=0}^{N-1} Yp = 0$$ .....(8)

$$\sum_{p=0}^{N-1} Xi * Yi = \frac{\sin \varphi}{(\cos \varphi)^2} * \sum_{p=0}^{N-1} Xp^2 + \frac{\mu}{\cos \varphi} \sum_{p=0}^{N-1} Xp * Yp = \frac{\sin \varphi}{(\cos \varphi)^2} * \sum_{p=0}^{N-1} Xp^2$$ .....(9)

$$a = \frac{N \sum_{p=0}^{N-1} Xi * Yi - 0}{N \sum_{p=0}^{N-1} Xi^2 - 0} = \frac{\frac{\sin \varphi}{(\cos \varphi)^2} \sum_{p=0}^{N-1} Xp^2}{\frac{1}{(\cos \varphi)^2} \sum_{p=0}^{N-1} Xp^2} = \sin \varphi$$ .....(10)

$$b = 0$$ .....(11)

$$\varphi = \sin^{-1} a$$ .....(12)

FIG. 9

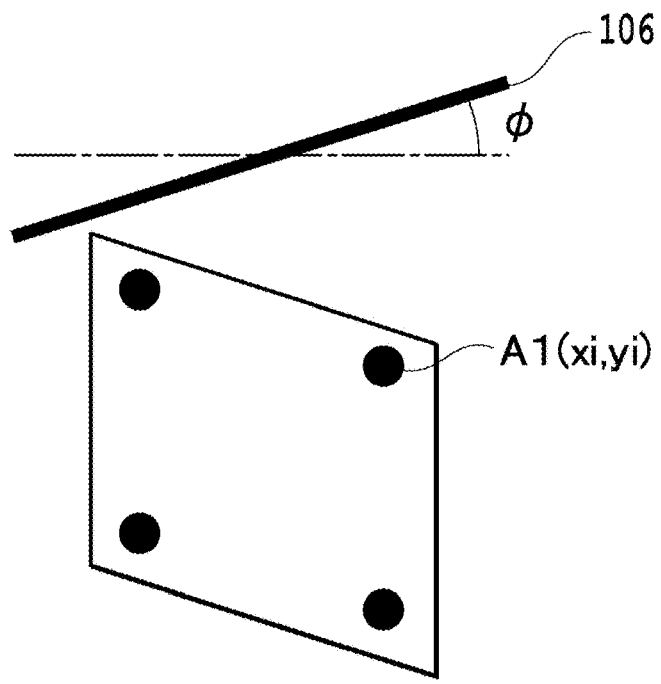
FIG.20A
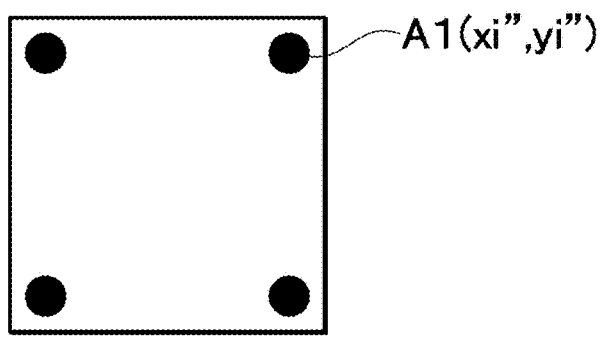
FIG.20B
$$xi'' = xi / \cos_{-1} \phi$$
$$yi'' = yi - xi / \tan \phi$$
FIG.20C

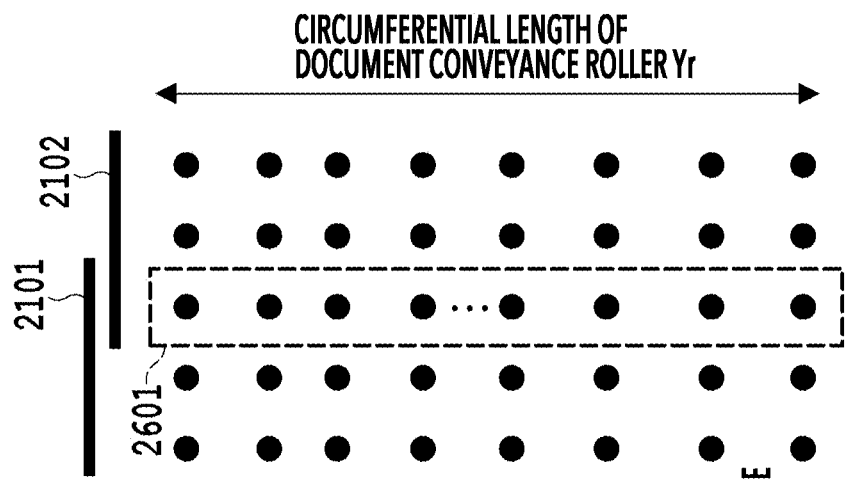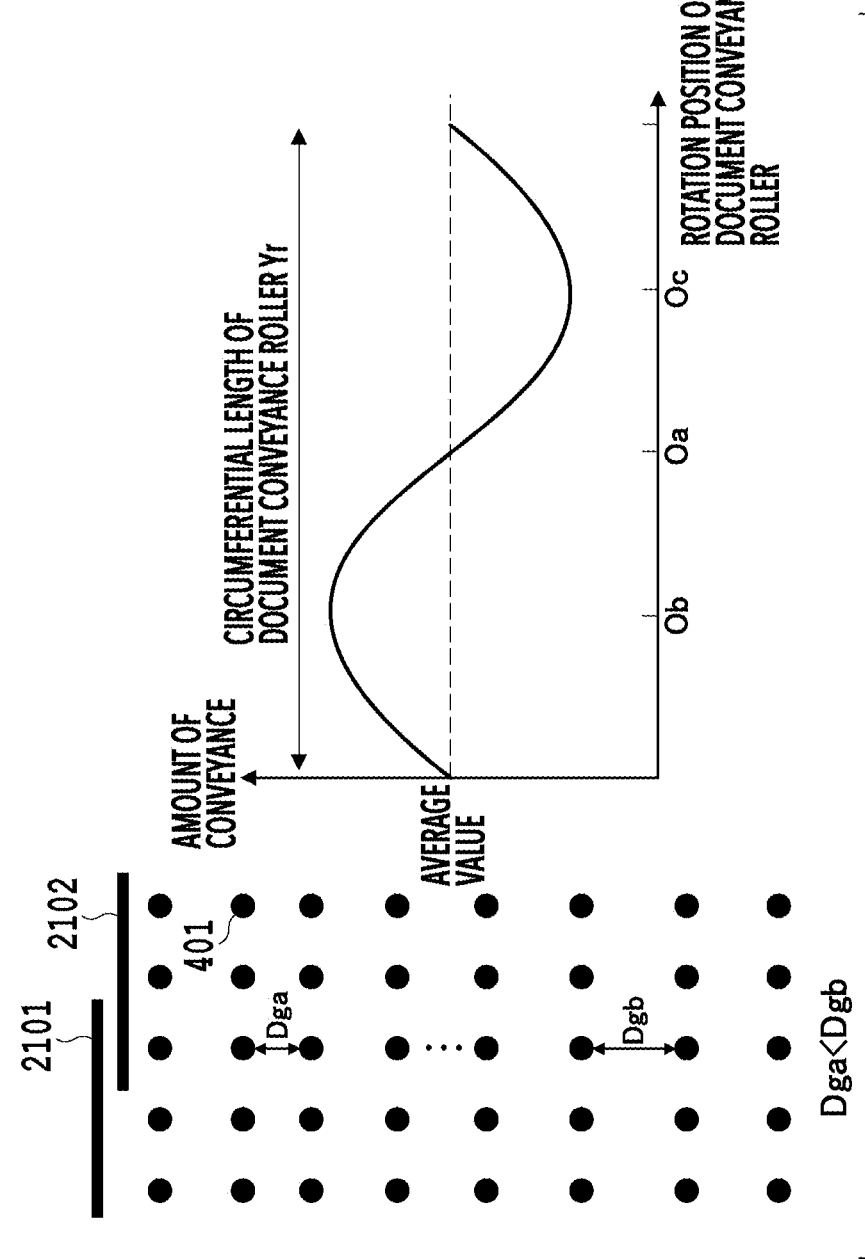
FIG.26B
FIG.26A

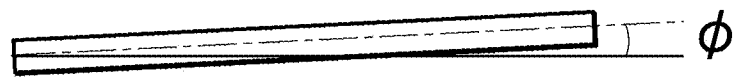
FIG.28A
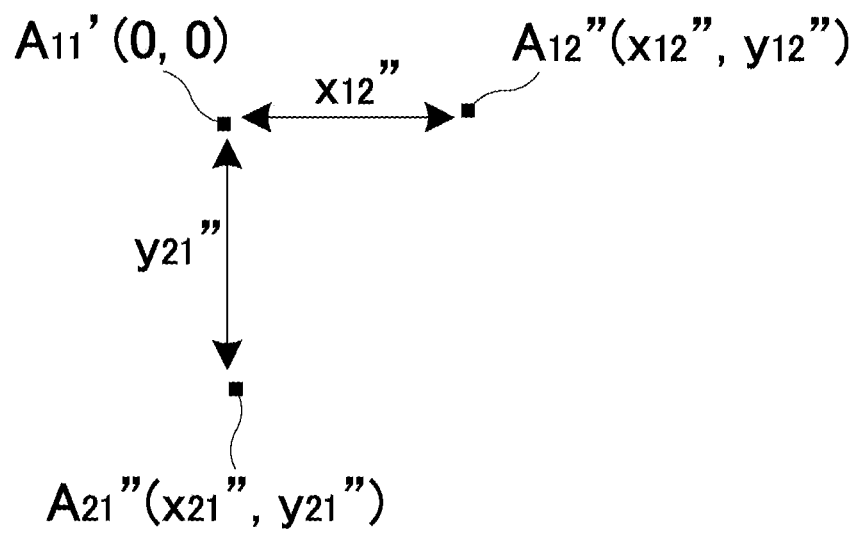
FIG.28B
$$x_{12}'' = x_{12}' / \cos_{-1} \phi$$
$$y_{12}'' = y_{12}' + x_{12}' / \tan \phi$$
$$x_{21}'' = x_{21}' / \cos_{-1} \phi$$
$$y_{21}'' = y_{21}' + x_{21}' / \tan \phi$$
FIG.28C

IMAGE READING APPARATUS, CONTROL METHOD THEREOF, AND STORAGE MEDIUM

BACKGROUND OF THE INVENTION

Field of the Invention

The present application relates to image correction in an image reading apparatus having a line image sensor.

Description of the Related Art

For an image reading apparatus for a large size document, generally, a configuration is adopted whose cost merit is great and which uses a plurality of small size line image sensors. Because a plurality of line image sensors is used, it is necessary to perform processing to connect data read by each line image sensor. At this time, in a case where there is an error component due to an inclination of the line image sensor, an error occurs in the connecting processing.

FIG. 19A to FIG. 19C show a general configuration of an image reading apparatus using a plurality of line image sensors and examples of reading. As shown in FIG. 19A, the configuration is such that a document 110 is conveyed by an upstream-side document conveyance roller 107 and a downstream-side document conveyance roller 108 and reading is performed by a plurality of line image sensors 106. At that time, processing to connect the results of reading by the plurality of the line image sensors 106 is performed at a connecting position 113, but in a case where there exits positional misalignment 1901 of the line image sensor 106, an inclination of the line image sensor 106 occurs and an error occurs at the connecting position. For example, as shown in FIG. 19B, in a case where a straight-line pattern 1902 is read, due to the inclination of each line image sensor 106, the pattern is read as a zigzag line 1903 in which misalignment in connecting position occurs at the time of connection.

For the above-described problem, accurate connection is implemented by deriving in advance an error component at the time of reading due to the inclination of the line image sensor by processing called calibration. In Japanese Patent Laid-Open No. 2007-304653, in order to perform calibration, by using a document including a combination of straight-line patterns, reading of the patterns is performed and based on the positional data on the read straight-line patterns, the inclination of the line image sensor is derived. At this time, it is required to derive the inclination of each line image sensor with a high accuracy.

SUMMARY OF THE INVENTION

However, in Japanese Patent Laid-Open No. 2007-304653, in a case where there exits a diameter error of a document conveyance roller, in addition to the inclination at the time of document setting in performing calibration, the diameter error affects the reading of the calibration document itself as an error component. Because of that, this prevents the error inherent in the image sensor from being found, and therefore, there is a concern about the accuracy of calibration.

Consequently, in view of the above-described problem, an object of one embodiment of the present invention is to perform calibration in an image reading apparatus having a line image sensor with a high accuracy.

One embodiment of the present invention is an image reading apparatus including: a line image sensor in which reading elements for reading an image are arrayed in a predetermined direction; a first derivation unit configured to, based on read data acquired by reading a chart on which a plurality of dot patterns is printed with the line image sensor, derive coordinates of each of the plurality of dot patterns; a second derivation unit configured to derive an inclination angle of the line image sensor based on the coordinates derived by the first derivation unit; and a first calculation unit configured to calculate a first correction value for correcting the inclination of the line image sensor based on the inclination angle derived by the second derivation unit, and on the chart, the plurality of dot patterns is arranged isolatedly from one another, the plurality of dot patterns includes at least one dot pattern group including one reference dot pattern and a plurality of peripheral dot patterns around the reference dot pattern, and the plurality of peripheral dot patterns is arranged so that a sum of coordinates from reference coordinates is zero in a case where coordinates of the reference dot pattern are taken to be the reference coordinates.

Further features of the present invention will become apparent from the following description of exemplary embodiments with reference to the attached drawings.

BRIEF DESCRIPTION OF THE DRAWINGS

FIG. 1A to FIG. 1C are diagrams showing a general configuration of an image reading apparatus in a first embodiment, and the like;

FIG. 9 is a diagram showing an algorithm used for derivation of the inclination angle of the CIS in the first embodiment;

FIG. 20A to FIG. 20C are diagrams explaining coordinate conversion based on an inclination of the CIS in a fifth embodiment;

FIG. 26A and FIG. 26B are diagrams explaining arrangement of circular dot patterns for suppressing the influence of eccentricity of a document conveyance roller used in a sixth embodiment;

FIG. 28A to FIG. 28C are diagrams explaining an inter-dot distance after inclination angle derivation;

DESCRIPTION OF THE EMBODIMENTS

In the following, embodiments for embodying the present application are explained with reference to the drawings. All the embodiments are explained by taking a sheet-feed type image reading apparatus as an example, but the application range of the present application is not limited to this and it is also possible to apply the present application to a flatbed type image reading apparatus.

First Embodiment

In the present embodiment, an aspect is explained in which the inclination of a line image sensor is derived by reading in advance a specific pattern, that is, the inclination of the line image sensor is derived by using a plurality of coordinates within the pattern.

<Configuration of Image Reading Apparatus>

First, the basic configuration of the image reading apparatus is explained by using the general diagram of the image reading apparatus, a diagram showing the image reading aspect, and the like.

Figure 1A:
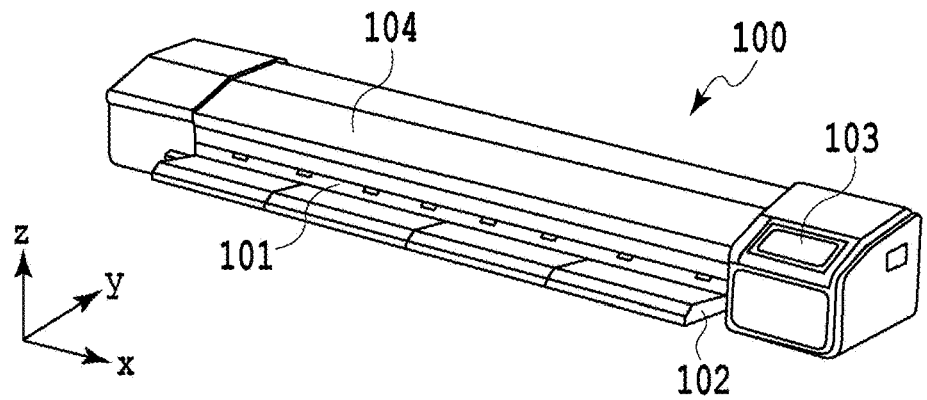

FIG. 1A is a perspective diagram showing an external appearance of a sheet-feed type scanner 100 as one example of the image reading apparatus in the present embodiment. As shown in FIG. 1A, the scanner 100 has a document feed port 101 and a document feed table 102 on the front side of the main body. A user places the tip portion of a document on the document feed table 102 so that the center portion of the document is located at the center of the feed port and inserts the document into the document feed port 101 so that the document slides on the table. The document feed port 101 is designed so as to permit, to a certain extent, positional misalignment, an inclination and the like at the time of insertion with respect to the document width in the main scanning direction, which the scanner 100 can read. The configuration of the feed path of a document will be described later by using FIG. 1B. For the sake of explanation, the coordinate axes are set as shown in FIG. 1A and the coordinate axes apply similarly to the other drawings.

The scanner 100 comprises an operation unit 103 on the top surface of the main body, which includes physical keys, a touch panel, an LCD panel and the like, and it is made possible to set reading conditions and input a document size. Further, on the top surface of the scanner 100, an upper cover 104 is provided and by the upper cover 104 opening upward, it is made possible to access the reading unit and the like, and therefore, it is possible to perform maintenance of the main body.

Figure 1B:
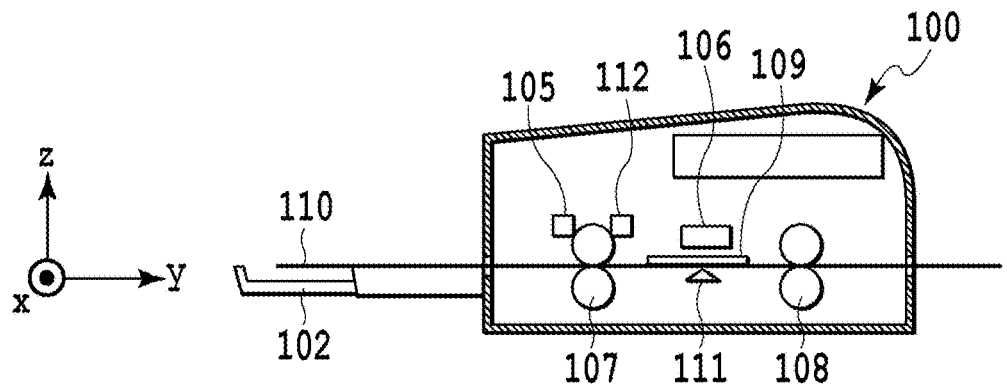
Figure 1C:
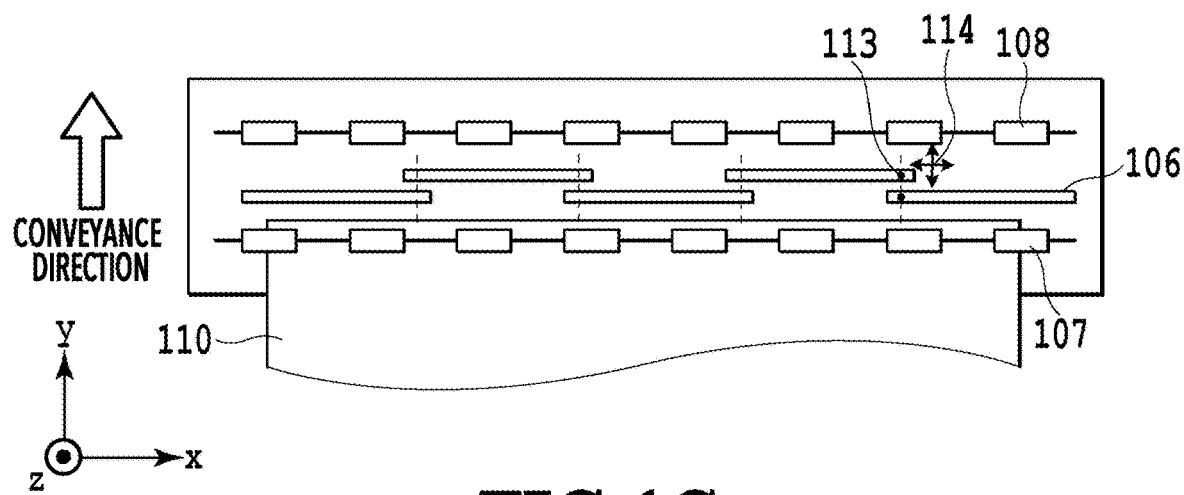

FIG. 1B and FIG. 1C are schematic diagrams showing the internal configuration of the scanner 100 and FIG. 1B shows a sectional diagram and FIG. 1C shows a top plan diagram. In the sectional diagram in FIG. 1B, the left side is the upstream side of the document feed and the right side is the downstream side and a document is conveyed in the +y-direction. The document 110 fed via the document feed table 102 by a user is discharged from the rear side of the main body through a planar conveyance path.

A document detection sensor 105 detects the insertion of the document 110 and in a case where the insertion of the document 110 is detected, a control unit 202 (see FIG. 2) of the scanner 100 causes the document to be pulled into the inside of the main body by rotating the upstream-side conveyance roller 107. An end portion detection sensor 112 is used to detect the tip portion of the document 110 pulled into the inside of the main body by the rotation of the upstream-side document conveyance roller 107. Further, the detection results of the end portion detection sensor 112 are also used to determine the reading start position of the document 110 and to detect the position of the rear end portion of the document 110.

Inside the main body, the document 110 passes between a glass plate 109 and a document pressing plate 111. The document pressing plate 111 functions to press the document 110 against the glass plate 109 by a predetermined pressure. The CIS 106 is a line image sensor in which light receiving elements are arrayed in the main scanning direction (X-direction in FIG. 1C) and includes a plurality of chips including a plurality of light receiving elements. The reading surface of the CIS 106 is in opposition to the glass plate 109 and designed so that the reading focus position is located at the contact surface between the document 110 and the glass plate 109.

The downstream-side document conveyance roller 108 is configured so as to follow the upstream-side document conveyance roller 107 by a belt, not shown schematically, and has a role to discharge the document that comes out of the pressing area in which the document pressing plate 111 presses the document against the glass plate 109 to the downstream side. The control unit 202, to be described later, includes each detection sensor, a motor, not shown schematically, for rotating the upstream-side document conveyance roller 107, a circuit substrate for controlling the CIS 106 and the operation unit 103, and the like.

The top plan diagram in FIG. 1C shows that the scanner 100 has a configuration in which a plurality of the CIS's 106 (in this example, five CIS's) is arranged in a staggered pattern in the main scanning direction. The scanner 100 performs reading with each CIS 106 and the control unit 202 performs processing to connect the data read with each CIS 106 at the connecting position 113.

Figure 2:
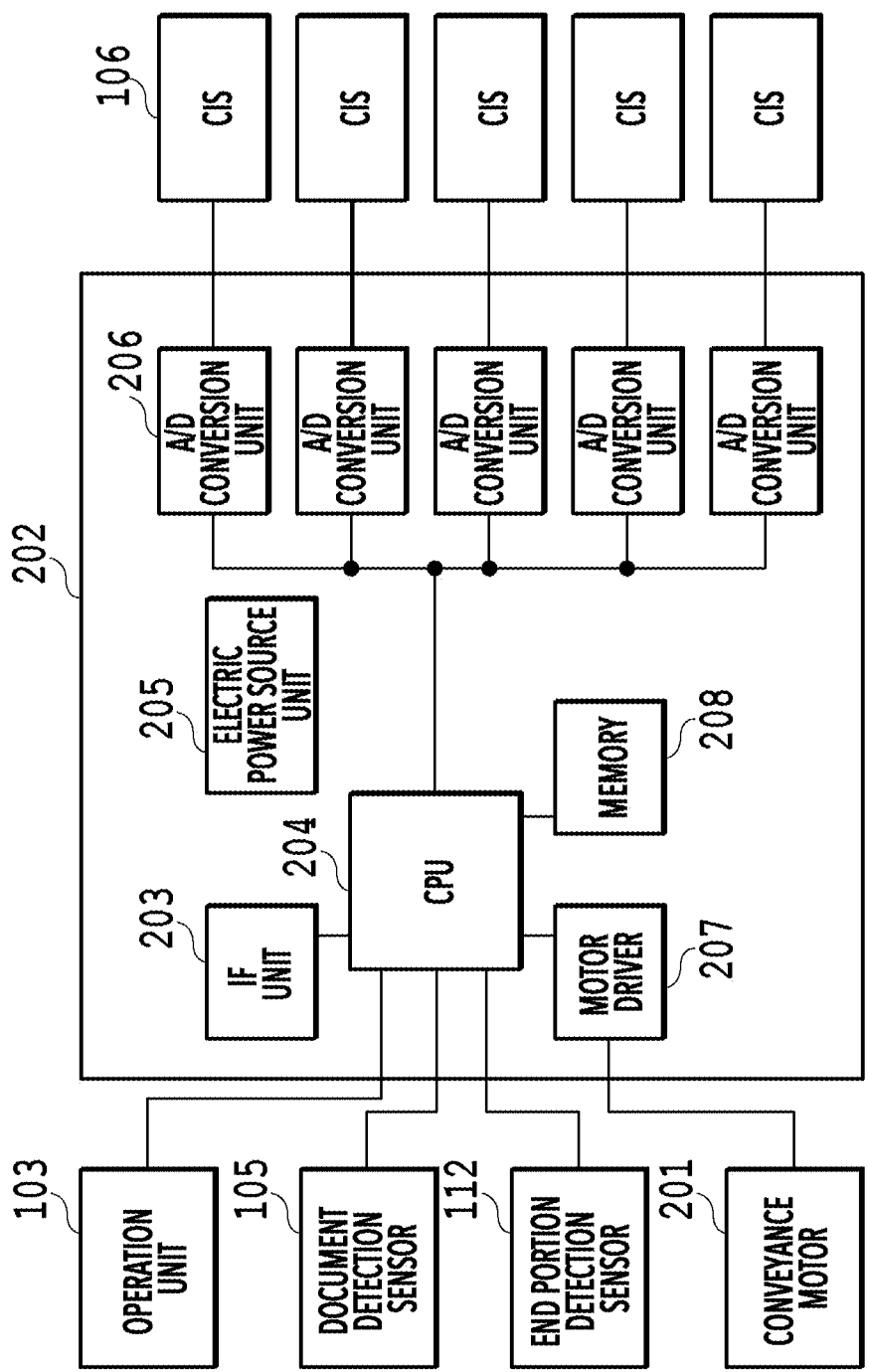
FIG. 2 is a block diagram showing a hardware configuration of the image reading apparatus in the first embodiment.

FIG. 2 is a block diagram showing a hardware configuration of the scanner 100 in the present embodiment. The control unit 202 that controls image reading and the like in the scanner 100 has a CPU 204, a memory 208, a motor driver 207, an interface (hereinafter, IF) unit 203, an A/D conversion unit 206, and an electric power source unit 205. The operation unit 103 includes an LCD (abbreviation of Liquid Crystal Display)-attached touch panel. On the LCD of the operation unit 103, information relating to a document to be read in accordance with instructions from the CPU 204, settings of the reading apparatus, and the like is displayed. Further, it is possible for a user to perform input for the scanner 100, for example, change various settings, by a touch panel operation for the operation unit 103 while checking the information displayed on the LCD of the operation unit 103.

A conveyance motor 201 is controlled by the CPU 204 via the motor driver 207 and rotates the upstream-side conveyance roller 107 and the downstream-side conveyance roller 108. The configuration is such that the outputs of the document detection sensor 105 and the end portion detection sensor 112 are input to the CPU 204 and the CPU 204 performs control, such as determination of the drive timing of the plurality of the CIS's 106, based on the change in the output signals of these sensors and the state of the conveyance motor 201.

The plurality of the CIS's 106 outputs the read image to the control unit 202 as an analog signal. The analog signal output from the plurality of the CIS's 106 is converted into a digital signal in each A/D conversion unit 206 and input to the CPU 204. It is possible for the CPU 204 to process the data converted into a digital signal in each A/D conversion unit 206 and transmit it as image data to an external device connected by USB or LAN via the IF unit 203. The electric power source unit 205 generates a voltage necessary for each unit and supplies power. It is possible for the memory 208 to store image data corresponding to a plurality of lines.

<Calibration>

Figure 3:
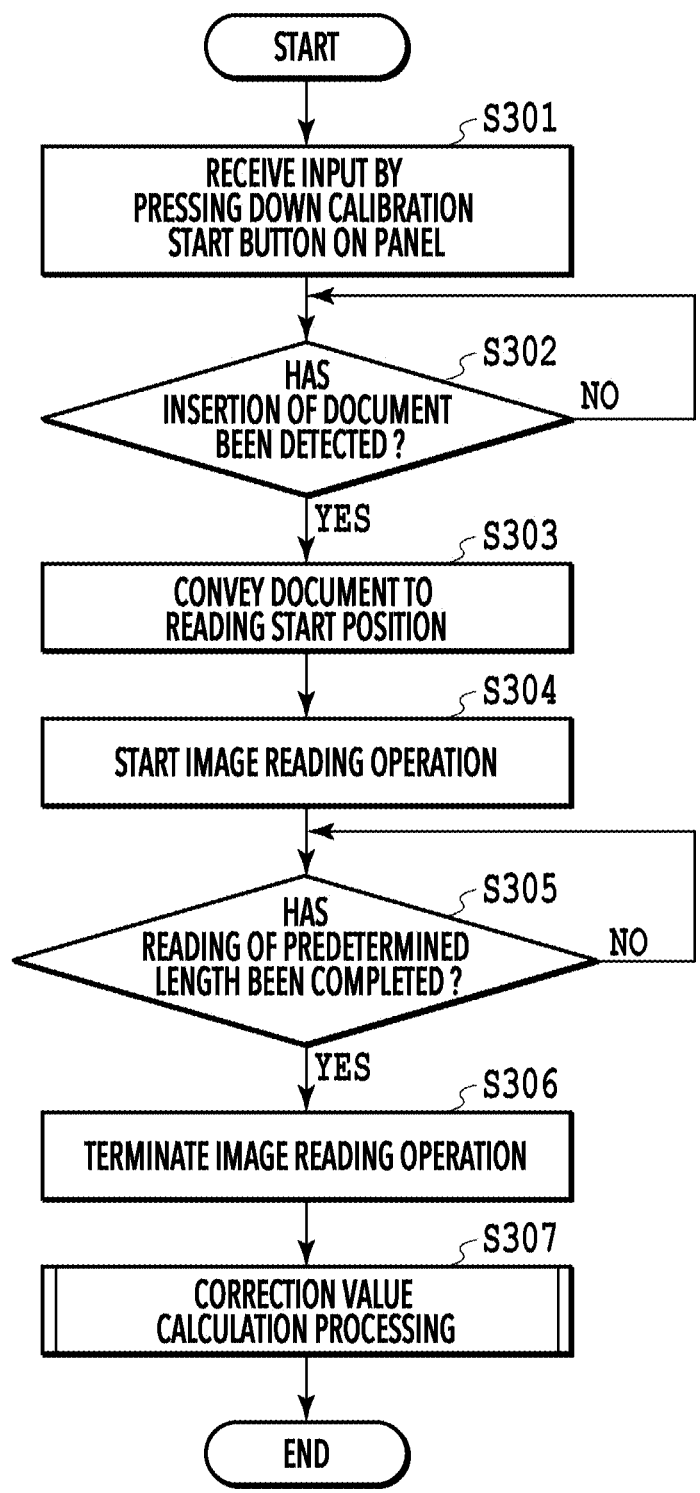
FIG. 3 is a flowchart of calibration processing of the image reading apparatus in the first embodiment.

In the following, a flow of performing reading of the document 110 by using the CIS 106 and correction value calculation is explained by using FIG. 3. As regards the correction value calculation timing, it may also be possible to calculate the correction value in advance or calculate the correction value each time of reading.

In a case where the correction value is calculated in advance, the correction value is calculated by reading a predetermined document prepared at the time of factory shipping or by a user and after this, the same correction value is applied each time of reading. In this case, it is not necessary to calculate the correction value each time of reading, and therefore, it is possible to make an attempt to reduce the reading time.

On the other hand, in a case where the correction value is calculated each time of reading, the correction value is calculated by reading a predetermined document before reading is performed, or by reading a document on which a pattern for correction value calculation is printed at the header portion of the document. In this case, it is made possible to correct the current error component at any time, and therefore, it is possible to implement reading with a high accuracy.

First, at step S301, the CPU 204 receives an input by pressing down a calibration start button on the operation unit 103 by a user. By this step, the scanner 100 enters a state of waiting for insertion of a dedicated document to be used for calibration. In the following, for simplicity, "step S-" is abbreviated to "S-".

At S302, the CPU 204 determines whether the insertion of the document 110 that is set by a user has been detected. In a case where the results of the determination at this step are affirmative, the processing advances to S303. On the other hand, in a case where the results of the determination at this step are negative, the insertion detection determination of the document 110 is performed again.

At S303, the CPU 204 conveys the document 110 to the reading start position by controlling the conveyance motor 201.

At S304, the CPU 204 starts the image reading operation and saves the data (referred to as read data) acquired by the reading in the memory 208.

At S305, the CPU 204 determines whether reading of a predetermined length has been completed. In a case where the results of the determination at this step are affirmative, the processing advances to S306. On the other hand, in a case where the results of the determination at this step are negative (that is, in a case where reading of a predetermined length has not been completed), the reading operation is continued until the reading of a predetermined length is completed.

At S306, the CPU 204 terminates the image reading operation and causes the calibration document 110 to be conveyed up to the sheet discharge position.

At S307, the CPU 204 performs correction value calculation processing. The correction value obtained at this step is stored in the memory 208 and read and applied at the time of the normal reading operation.

Figure 4A:
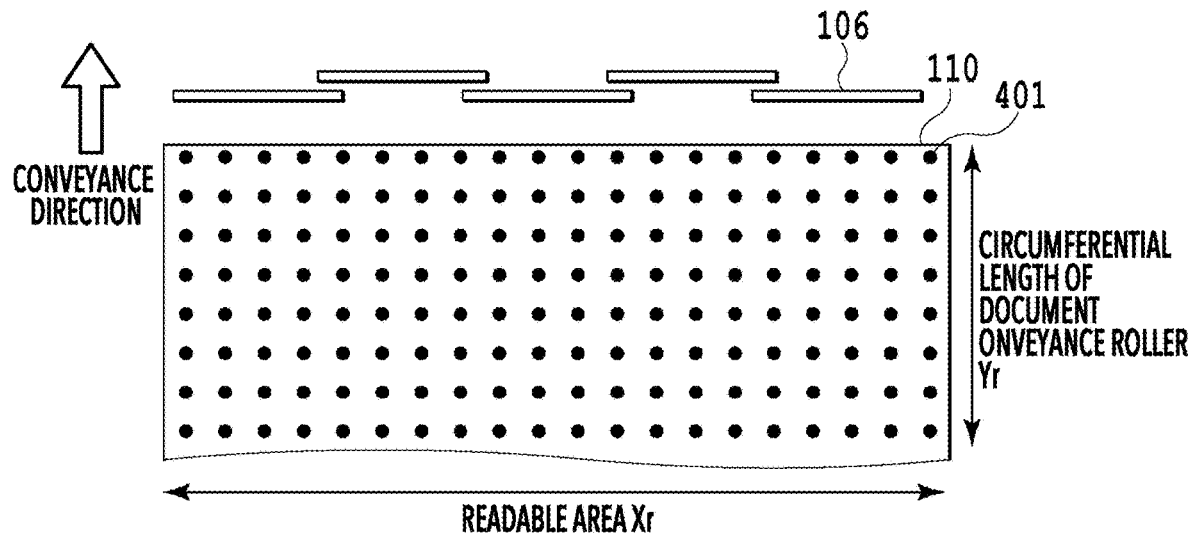
FIG. 4A and FIG. 4B are diagrams showing a correction value calculation processing pattern.
Figure 5:
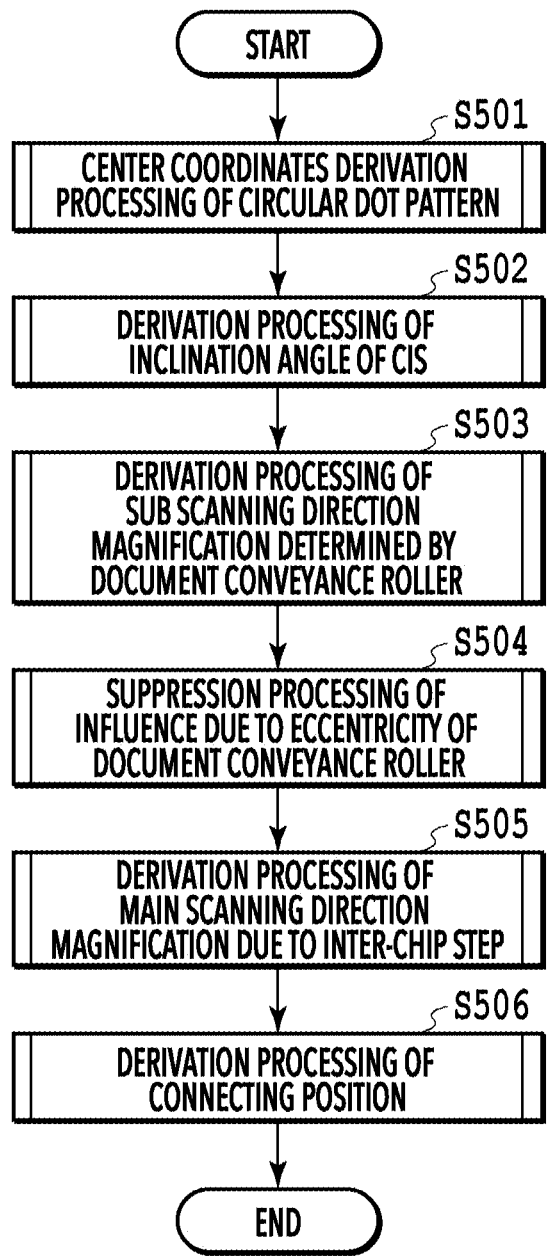
FIG. 5 is a flowchart explaining correction value calculation processing in the first embodiment.

Following the above, a flow of performing correction value calculation based on the read pattern (details of S307 in FIG. 3) is explained by using FIG. 4A and FIG. 5. FIG. 4A is a diagram showing a correction value calculation processing pattern (also called calibration chart) in the present embodiment. As shown in FIG. 4A, on the calibration chart, a plurality of circular dot patterns 401 including a plurality of ON dots (whose pixel value is 1) is printed isolatedly from one another and the circular dot patterns 401 are read while conveying the document by the document conveyance roller. As the pattern arrangement on the document, the plurality of the circular dot patterns 401 is printed across the width of the readable area (indicated by Xr) and the length corresponding to the circumference of the document conveyance roller 104 (the circumferential length is indicated by Yr). It may also be possible to print the plurality of the dot patterns 401 corresponding to a length longer than the circumference of the document conveyance roller 104. Further, in the present specification, the circular dot pattern 401 is also called a grid point.

First, at S501, the CPU 204 functions as a derivation unit configured to derive center coordinates of the circular dot pattern 401 and derives the center coordinates of each circular dot pattern 401 from the read data acquired by image reading. In the derivation processing of each correction value, to be described later, the center coordinates derived at this step are used.

At S502, the CPU 204 performs derivation processing of an inclination angle of the CIS 106. Specifically, the inclination angle is calculated by making use of that the plurality of the circular dot patterns is arranged concentrically so that the sum of the coordinates from the reference coordinates is zero. The derivation processing of the inclination angle at this step is processing for suppressing misalignment in the connecting position 113 at the time of connecting the read data. By the information on the inclination angle of the CIS 106, which is found at this step, it is made possible to perform the connection of the read images later with a high accuracy. The derivation processing of each correction value, to be described later, is performed by applying in advance the correction value in accordance with the inclination angle of the CIS 106, which is derived at S502.

At S503, the CPU 204 performs derivation processing of a sub scanning direction magnification determined by the document conveyance roller. The derivation processing of the sub scanning direction magnification determined by the document conveyance roller is processing to derive a sub scanning direction magnification due to diameter errors of the document conveyance rollers 107, 108, which affect the entire reading results of the scanner 100.

At S504, the CPU 204 performs processing to suppress the influence due to the eccentricity of the document conveyance roller. This step is, for example, processing for correcting a reading error in the sub scanning direction due to eccentricity of the document conveyance roller, which affects the entire reading results of the scanner 100, by finding an eccentricity rate of the document conveyance roller, and the like.

At S505, the CPU 204 performs derivation processing of a main scanning direction magnification due to an inter-chip step. The derivation processing of the main scanning direction magnification due to the inter-chip step is processing for correcting a reading error in the main scanning direction due to a gap between each chip located inside the CIS 106.

At S506, the CPU 204 performs derivation processing of a connecting position. The derivation processing of the connecting position is processing for accurately connecting the reading results of each CIS 106, and processing to derive the connecting position 113 by applying in advance the correction value corresponding to each step that is found from the results at S502 to S505. By the above, the calibration accompanied by the calculation of each correction value is completed.

<Center Coordinates Derivation Processing>

Figure 6:
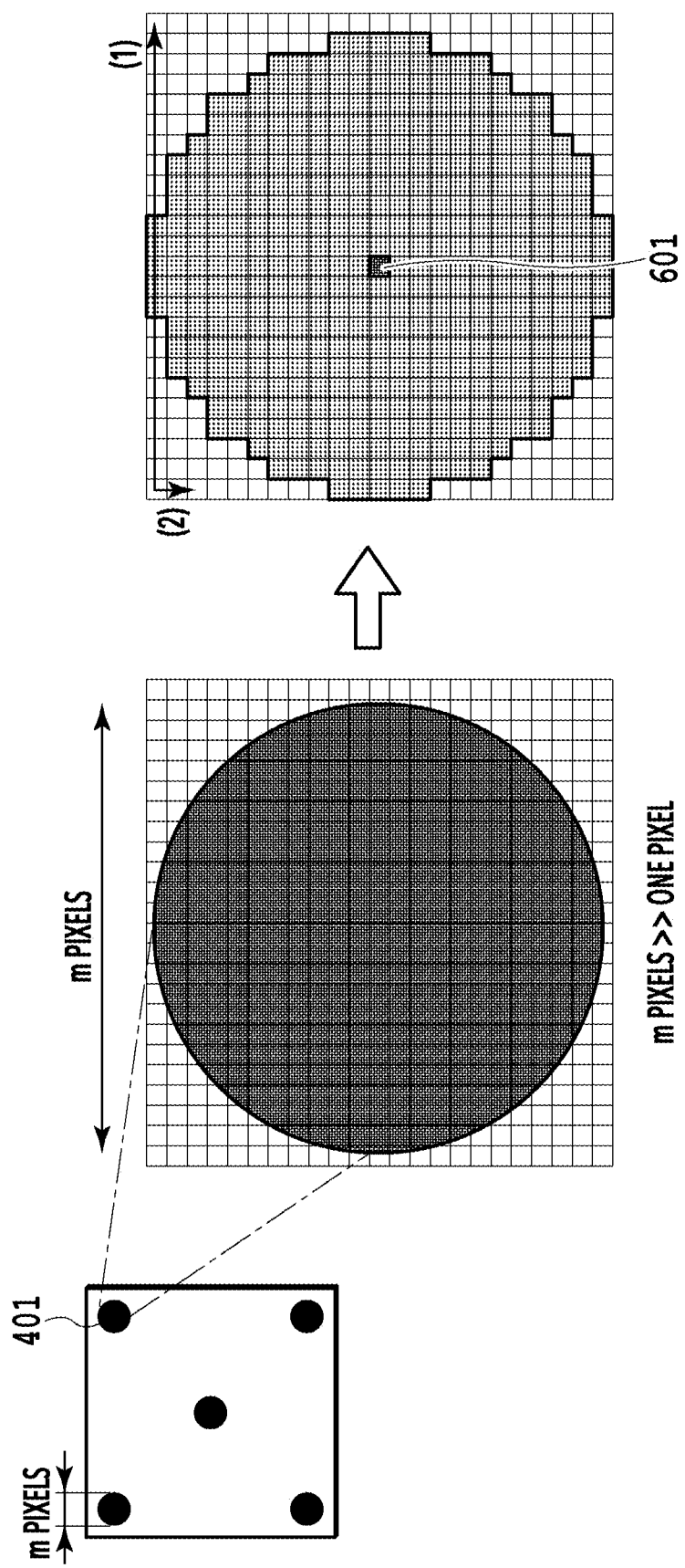
FIG. 6 is a diagram showing a reading-target circular dot pattern in the first embodiment.

In the following, the processing (S501 in FIG. 5) to derive the center coordinates of the circular dot pattern based on the read data is explained specifically by using the circular dot pattern 401 shown in FIG. 6 and the flowchart in FIG. 7. As shown in FIG. 6, the circular dot pattern 401 needs to be a size to a certain level for the reading-target pixel by the scanner.

First, at S701, the CPU 204 extracts all the pixel data in the main scanning direction (1) of the CIS 106 at the position of interest in the sub scanning direction (2) of the CIS 106 among all the read data.

At S702, the CPU 204 determines whether there are pixels in succession in the main scanning direction (1) whose tone value exceeds a threshold value Xt based on the pixel data extracted at S701 and performs binarization for each pixel as shown in FIG. 6. In a case where the results of the determination at this step are affirmative, the processing advances to S703 and on the other hand, in a case where the determination results are negative, the processing advances to S705. The threshold value Xt that is used at this step is set in advance and the data thereon is saved in the memory 208.

At S703, the CPU 204 derives the position of the pixel located at the center of the pixels in succession whose tone value exceeds the threshold value Xt as the center coordinates in the main scanning direction (1).

At S704, the CPU 204 determines whether the derivation of the center coordinates in the main scanning direction (1) has been completed for all the lines in the sub scanning direction (2).

At S705, the CPU 204 advances the position of interest by one pixel in the sub scanning direction (2).

At S706, the CPU 204 calculates an average of the derived center coordinates in the main scanning direction and sets the found average value as center coordinates 601 of the circular dot pattern 401.

It is possible to deal with a case where a reading error due to dust is taken into consideration at the time of finding the center coordinates in the main scanning direction by increasing the size of the dot pattern. Further, in a case where a reading error due to an inter-chip gap of the CIS 106 is taken into consideration, it is necessary to find the center coordinates by selecting a portion that does not extend over two or more chips at the time of finding the coordinates in the main scanning direction (1).

It is desirable for the shape of the dot pattern to be an approximate circle as shown in FIG. 6. The reason is that the approximate circle is a shape that is hardly affected by an error component during reading at the time of deriving the center coordinates 601. For example, in a case where there is an inclination at the time of document setting, on a condition that the shape of the dot pattern is a square, it is difficult to determine which pixels of the pixel data in the main scanning direction (1) are those in succession in the main scanning direction (1) whose tone value exceeds the threshold value Xt for the read image data of the CIS 106. It is easier to determine the image data in succession in the main scanning direction (1) whose tone value exceeds the threshold value Xt in a case where the shape is an approximate circle rather than a square. Further, in a case where the dot pattern is an approximate circle, it may be possible not to perform the processing to derive the center coordinates for all the lines in the sub scanning direction (2) as at S704 to S706 in FIG. 7, That is, on the premise that the dot pattern is an approximate circle, it is possible to derive the center coordinates 601 of the dot pattern by estimating the pixel data in succession in the main scanning direction (1) whose tone value exceeds the threshold value Xt, and therefore, it is made possible to reduce the time required for derivation of the center coordinates.

<Derivation of Inclination Angle of CIS>

By using the center coordinates 601 derived by the center coordinates derivation processing described previously, the processing at S502 to S506 is performed. As described previously, in the present embodiment, the inclination angle of the CIS 106 is derived in advance, and therefore, in the following, of the flow of the correction value calculation shown in FIG. 5, the derivation processing of the inclination angle of the CIS at S502 is explained.

Figure 8A:
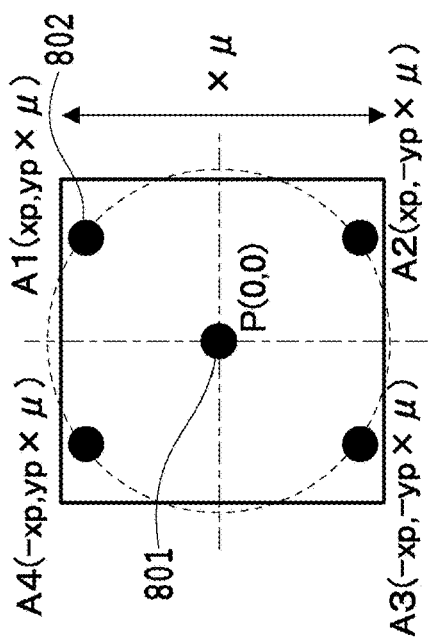
FIG. 8A to FIG. 8D are diagrams showing patterns used for derivation of an inclination angle of a CIS in the first embodiment.
Figure 10:
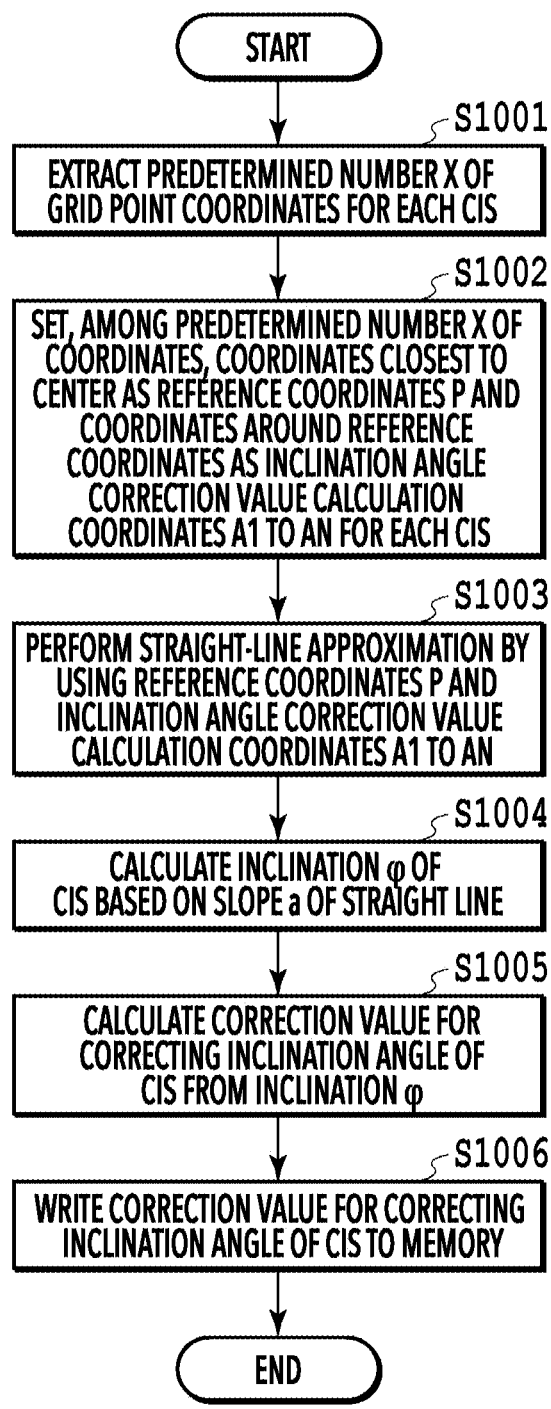
FIG. 10 is a flowchart explaining correction value calculation accompanied by derivation of the inclination angle of the CIS in the first embodiment.

Here, by using the inclination angle derivation pattern of the CIS 106 shown in FIG. 8A, the algorithm shown in FIG. 9, and the flowchart shown in FIG. 10, a flow of deriving the inclination angle of the CIS 106 by reading the circular dot pattern 401 is shown. The circular dot pattern group shown in FIG. 8A includes a circular dot pattern at the center (referred to as a reference dot pattern) and four circular dot patterns around the reference dot pattern (referred to as peripheral dot patterns). By using the arrangement of the circular dot patterns 401 such as this, it is made possible to accurately derive the inclination of the CIS 106 irrespective of the inclination at the time of document setting and the diameter error of the document conveyance roller.

First, at S1001, the CPU 204 extracts a predetermined number (assumed to be X) of center coordinates of the circular dot pattern 401 for each CIS 106.

At S1002, the CPU 204 sets, among the predetermined number X of coordinates, the coordinates closest to the center as reference coordinates P and the coordinates around the reference coordinates as inclination angle correction value calculation coordinates A1 to AN for each CIS 106. FIG. 8A shows a case where the reference coordinates P are taken as a center and the four points whose inclination angle correction value calculation coordinates are A1 to A4 exist therearound.

At S1003, the CPU 204 performs straight-line approximation that takes the reference coordinates P as a transit point by using the reference coordinates P and the inclination angle correction value calculation coordinates A1 to AN, which are set at S1002.

Figure 8B:
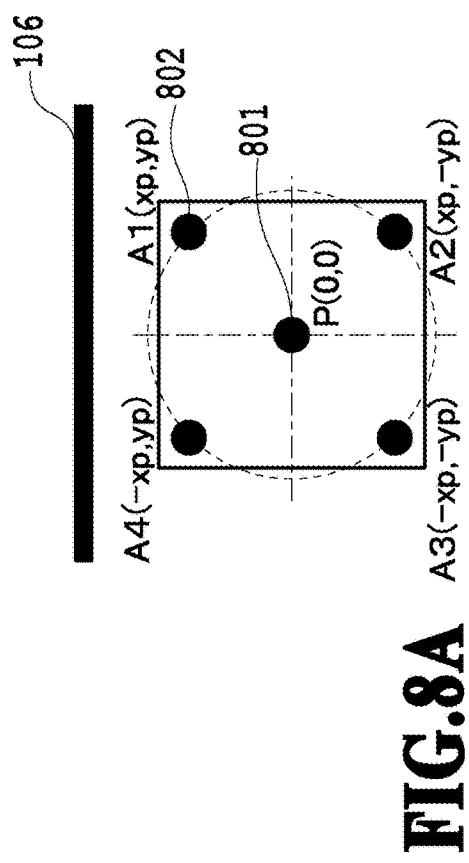
Figure 8C:
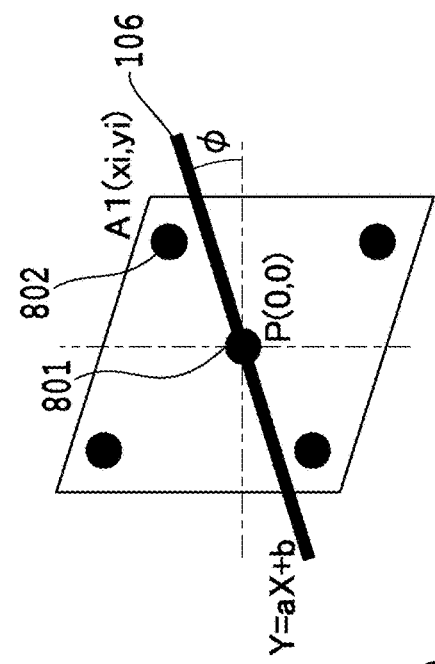

A change in coordinates at the time of performing straight-line approximation and the algorithm of inclination angle derivation are explained by using FIG. 8B to FIG. 8D and FIG. 9. FIG. 8B shows a coordinate change in the inclination angle correction value calculation coordinates with the reference coordinates P being taken as a reference in a case where the document 110 is read in an inclined state, showing a case where a document inclination angle θ=45°. FIG. 8C shows a coordinate change in the inclination angle correction value calculation coordinates with the reference coordinates P being taken as a reference in a case where there is a diameter error of the upstream-side document conveyance roller 107, showing a case where the sub scanning direction magnification determined by the document conveyance roller is μ.

FIG. 9 shows formulas used in the derivation algorithm of an inclination angle φ of the CIS 106. Formula (1) indicates that the sum of each inclination angle correction value calculation coordinates with the reference coordinates P being taken as a reference is zero. The calculation formula of formula (1) does not change even in a case where there is an influence of the document inclination angle θ and the sub scanning direction magnification μ determined by the document conveyance roller, which are shown in FIG. 8B and FIG. 8C.

Figure 8D:
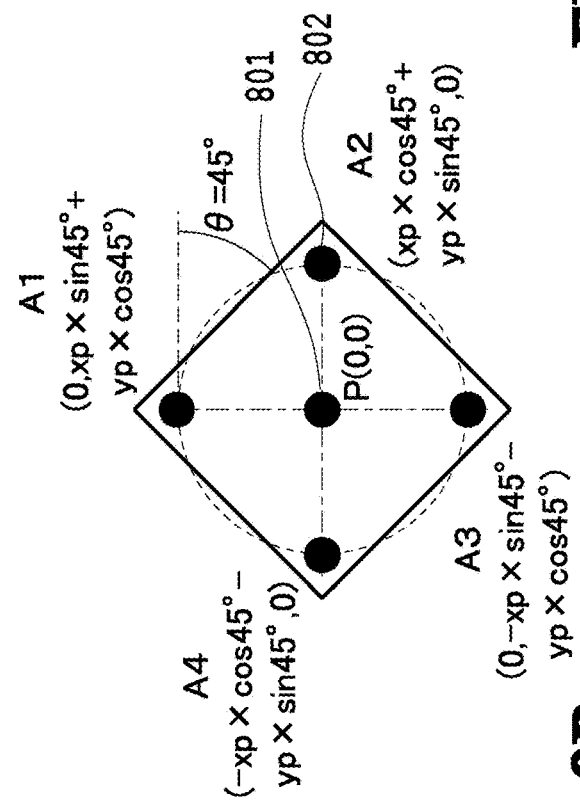

Next, FIG. 8D shows a coordinate change in the inclination angle correction value calculation coordinates with the reference coordinates P being taken as a reference in a case where reading is performed in a state where the inclination angle φ of the CIS 106 exists. Formula (2) to formula (5) in FIG. 9 show coordinates after the change at the time of the coordinate change in the inclination angle correction value calculation coordinates due to the inclination angle φ of the CIS 106.

Formula (6) in FIG. 9 is an approximate formula used at the time of performing straight-line approximation by the inclination angle correction value calculation coordinates A1 to AN with the reference coordinates P being taken as a reference, which is performed at S1003, and formula (7) in FIG. 9 shows the slope and the intercept in formula (6). Formulas obtained by substituting formula (2) to formula (5) in each constituent formula in formula (7) in FIG. 9 are formula (8) to formula (10).

In a case where formula (8) to formula (10) in FIG. 9 are substituted in formula (7), it is possible to simplify formula (7) to formula (11). Then, a formula used to derive the inclination angle φ of the CIS 106 based on the slope indicated in formula (11) is formula (12).

At S1003, the CPU 204 calculates a slope a of the straight line by performing straight-line approximation in accordance with the algorithm shown in FIG. 9.

At S1004, the CPU 204 calculates the inclination angle φ of the CIS 106 by using formula (12) based on a calculated at S1003.

At S1005, the CPU 204 calculates a correction value for correcting the inclination angle of the CIS 106 based on φ calculated at S1004.

At S1006, the CPU 204 saves the correction value calculated at S1005 by writing it to the memory 208.

As a method of applying a correction value, it is possible to adopt a method of performing reading while changing the access portion of the memory each time of reading based on the correction value written to the memory at S1006, or a method of physically adjusting the inclination of the CIS 106. Alternatively, it may also be possible to directly change the access portion of the memory without finding the inclination angle φ of the CIS 106 by using the slope a of the straight line calculated at S1003, or to physically adjust the inclination of the CIS 106.

Figure 11A:
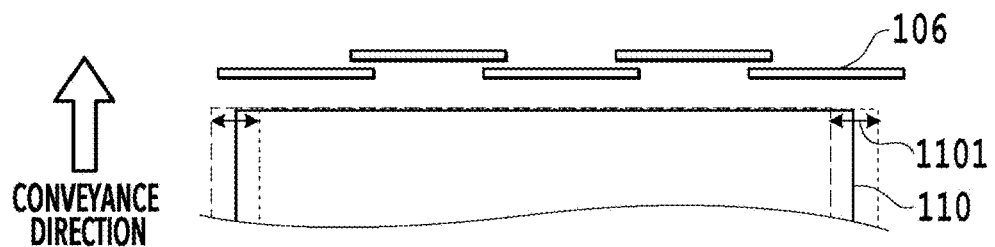
FIG. 11A to FIG. 11C are diagrams showing misalignment at the time of document setting and arrangement of circular dot patterns in the first embodiment.
Figure 11B:
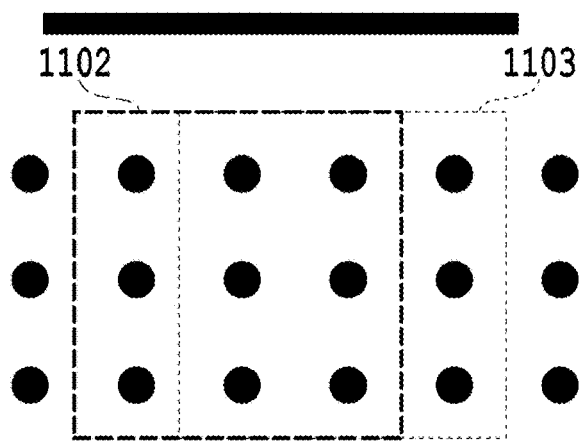
Figure 11C:
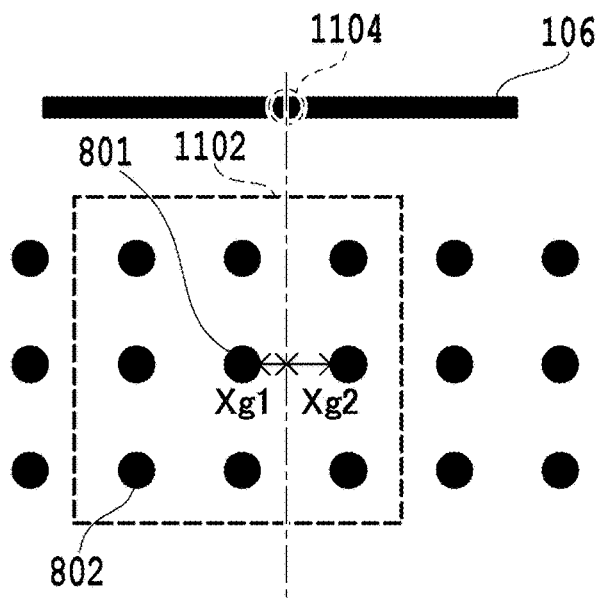

FIG. 11A to FIG. 11C show misalignment at the time of document setting, and dot pattern arrangement. Here, a case is discussed where misalignment in document setting 1101 occurs as a result of a user setting the document 110 as shown in FIG. 11A. In the case such as this, with the configuration in which only one pattern including the center grid point and the four peripheral grid points thereof as shown in FIG. 8A is arranged for the CIS 106, there is a possibility that this one pattern is not accommodated within the reading width depending on the length of the CIS 106.

Consequently, as shown in FIG. 11B, the circular dot patterns (grid points) are arranged so that the CIS 106 reads two patterns (first inclination angle correction value calculation processing pattern 1102, second inclination angle correction value calculation processing pattern 1103). Due to this, even in a case where the misalignment at the time of document setting 1101 exists, it is made possible to derive the inclination angle φ of the CIS 106. In a case where it is possible to read two patterns at the time of deriving the inclination angle φ, as shown in FIG. 11C, the inclination angle φ of the CIS 106 is derived by extracting the predetermined number X of coordinates close from center coordinates 1104 of the reading width. In the case of FIG. 11C, coordinates Xg1 are close to the center coordinates 1104 compared to coordinates Xg2. Consequently, the first inclination angle correction value calculation processing pattern 1102 whose center is the coordinates Xg1 is used and the inclination angle φ is derived by taking the coordinates Xg1 as the reference coordinates P.

Figure 12:
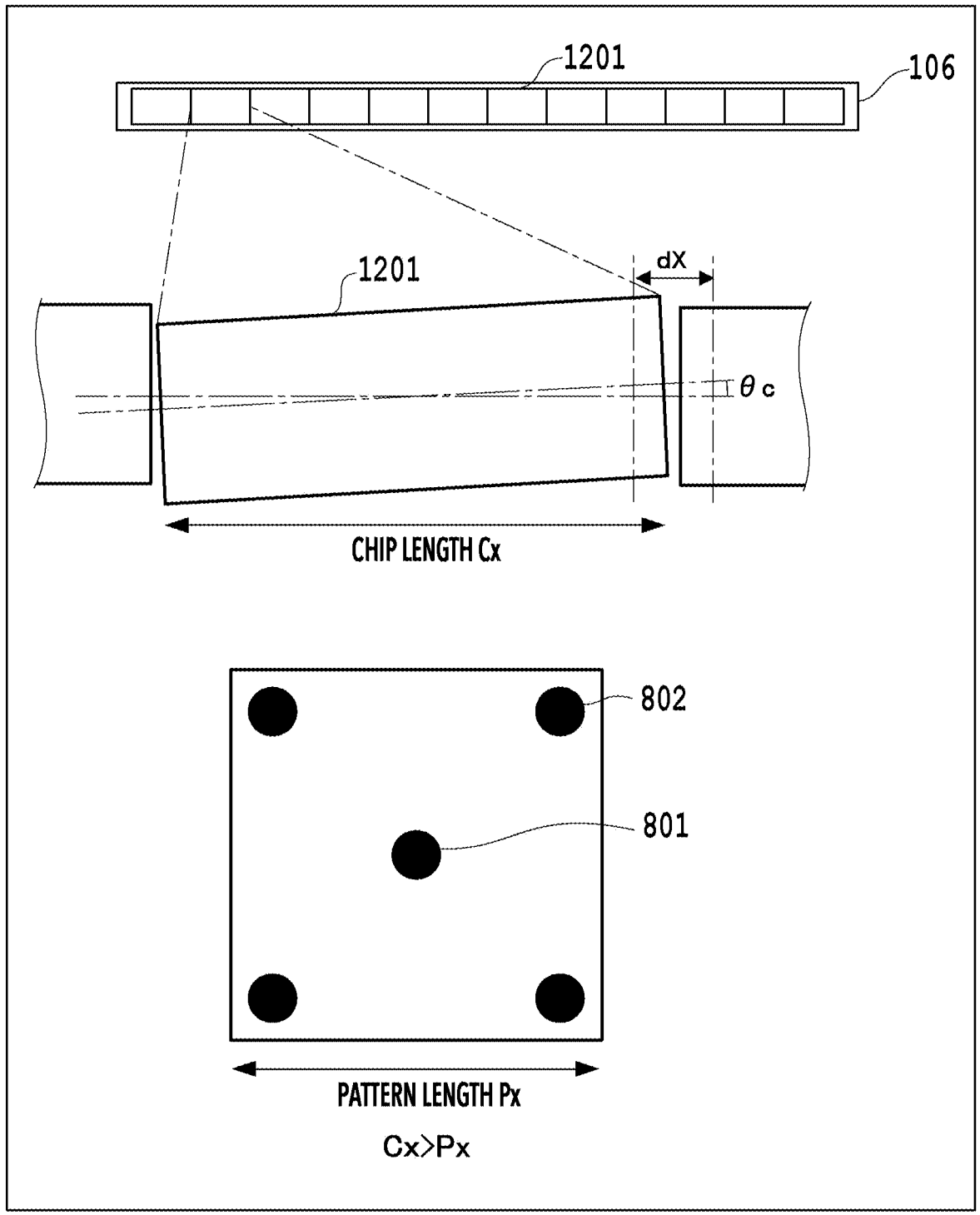
FIG. 12 is a diagram showing an internal structure of the CIS and arrangement of circular dot patterns in the first embodiment.

FIG. 12 shows the internal structure of the CIS 106 and the arrangement of an inclination angle correction value calculation processing pattern including a plurality of (in this example, five) circular dot patterns. Generally, the CIS 106 includes a plurality of chips and for each chip 1201, a chip inclination angle θc and positional misalignment dx between chips exist. As shown in FIG. 12, the width of the chip (referred to as chip length Cx) is greater than the width of the circular dot pattern group (referred to as pattern length Px).

In FIG. 10, the derivation of the inclination angle of the CIS 106 is shown, but as shown in FIG. 12, by arranging the circular dot patterns so that the inclination angle can be derived for each chip 1201, it is possible to derive the inclination θc of each chip 1201 by ignoring the influence of the gap dx between chips. In a case where it is desired to suppress the influence due to the misalignment in document setting 1101 as shown in FIG. 11A to FIG. 11C, it is possible to deal with the case by arranging two inclination angle correction value calculation processing patterns for the chip 1201.

<Effects and the Like of the Present Embodiment>

In the example described previously, explanation is given by taking the image reading apparatus having a plurality of CIS's, but it is also possible to apply the present embodiment to an image reading apparatus having only one CIS.

According to the present embodiment, it is possible to accurately derive the inclination of the CIS 106 irrespective of the inclination at the time of document setting and the diameter error of the document conveyance roller.

Second Embodiment

In the present embodiment, even in a case where there is eccentricity in the document conveyance roller, the inclination angle of the CIS 106 is derived accurately. In detail, by using a plurality of patterns existing along the conveyance direction of the upstream-side document conveyance roller 107, the inclination of the CIS 106 is derived. In the following, differences from the already-described embodiment are explained mainly and explanation of the same contents as those of the already-described embodiment is omitted appropriately.

Figure 13B:
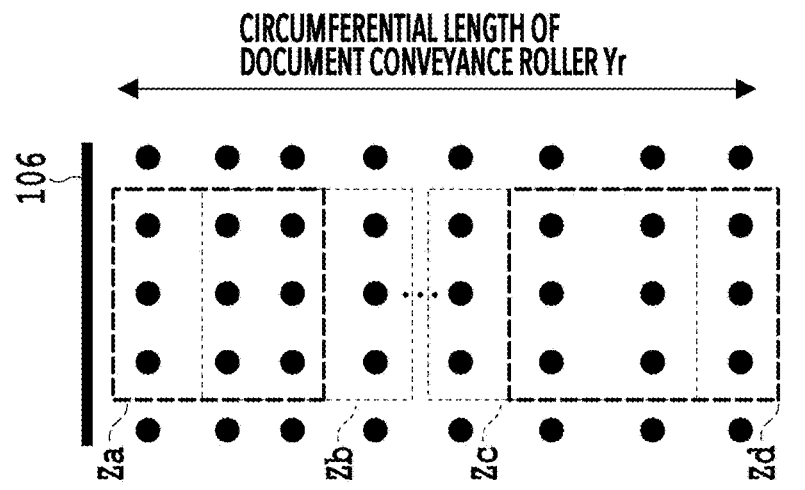
FIG. 13A and FIG. 13B are diagrams explaining a pattern for suppressing the influence of eccentricity of a document conveyance roller in a second embodiment.

In the following, by using patterns for suppressing the influence of eccentricity of the document conveyance roller shown in FIG. 13A and FIG. 13B and a flowchart shown in FIG. 14, processing to accurately derive the inclination angle of the CIS 106 even in a case where there is eccentricity in the document conveyance roller is explained.

Figure 13A:
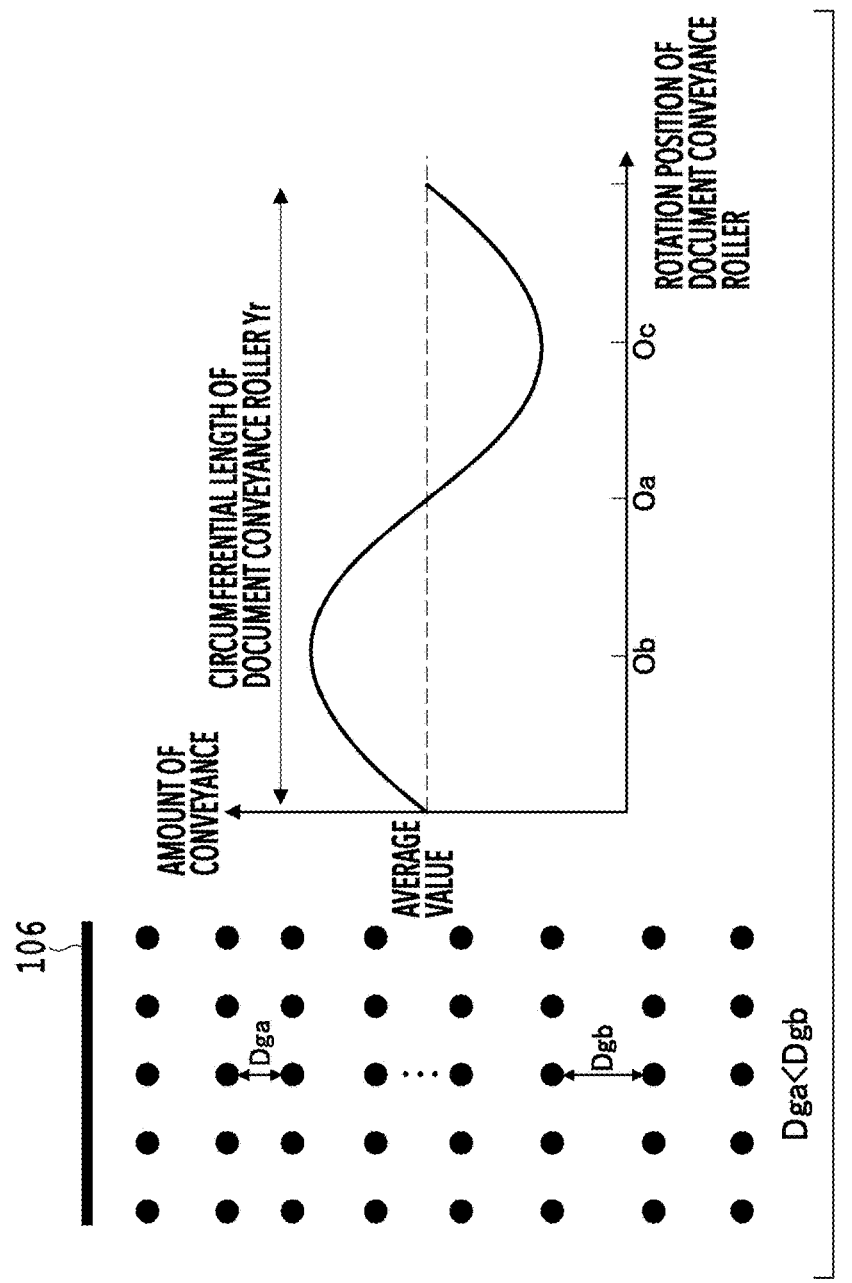
Figure 14:
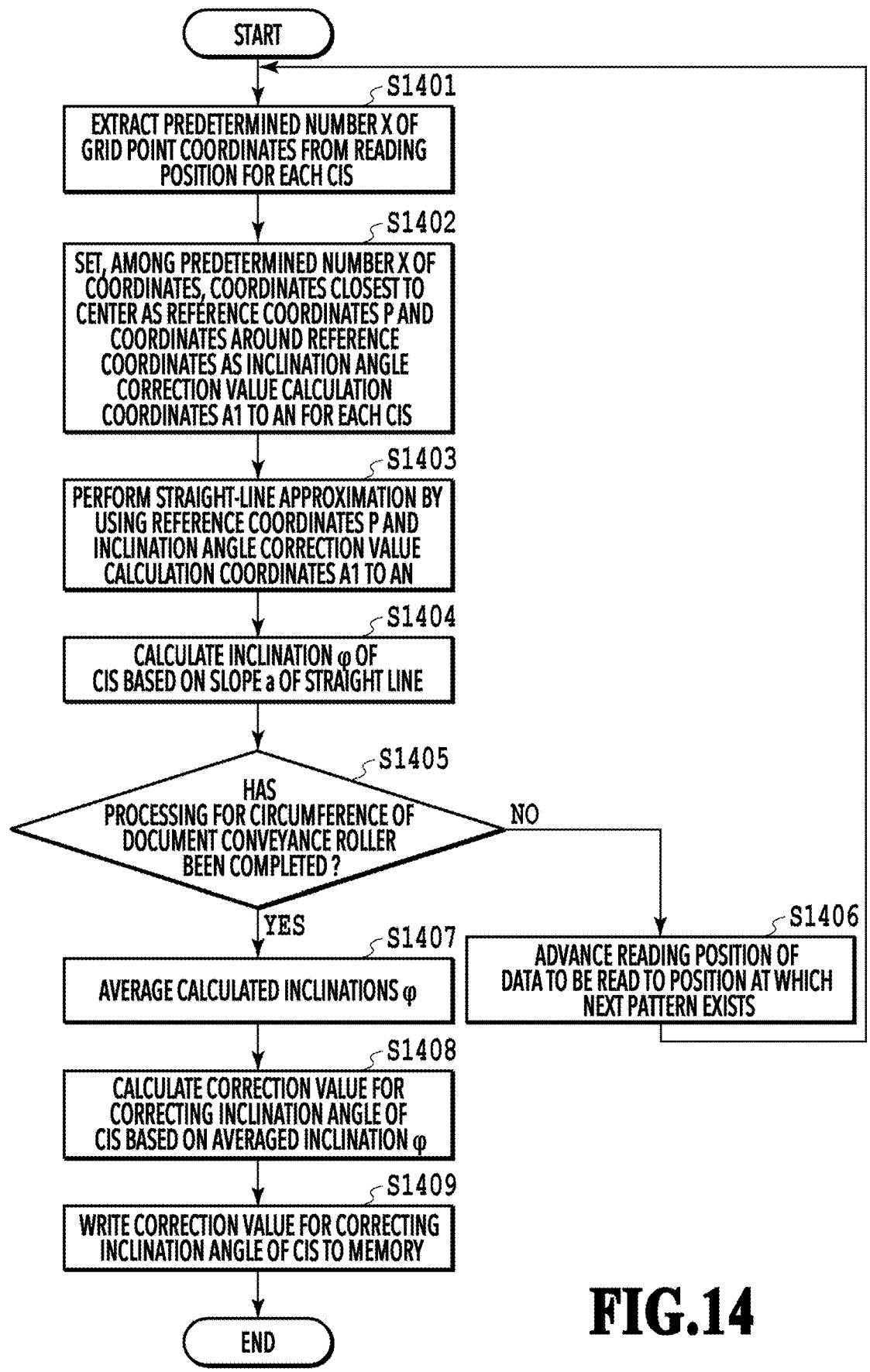
FIG. 14 is a flowchart of processing for suppressing the influence of eccentricity of the document conveyance roller in the second embodiment.

FIG. 13A shows results of reading a pattern in a case where there is eccentricity in the document conveyance roller. By the center position of rotation misaligning due to the eccentricity of the document conveyance roller, the amount of conveyance by the document conveyance roller changes. Because of this, in addition to a position Oa at which the amount of conveyance is average, a position Ob at which the amount of conveyance is large and a position Oc at which the amount of conveyance is small exist along the circumference of the document conveyance roller. An example of results of reading the circular dot patterns 401 in a situation in which the amount of conveyance changes depending on the position such as this is the pattern shown in FIG. 13A. By the reading at the position Ob at which the amount of conveyance of the document conveyance roller is large, an interval Dga between circular dot patterns in close proximity is short. On the other hand, by the reading at the position Oc at which the amount conveyance is small, an interval Dgb between circular dot patterns in close proximity is wide. In the state such as this, it is not possible to accurately derive the inclination angle of the CIS 106.

FIG. 13B shows an aspect in which the inclination angle of the CIS 106 is derived by suppressing the influence of eccentricity of the document conveyance roller. For a circumferential length Yr of the document conveyance roller, a circular dot pattern group (referred to as inclination angle correction value calculation processing patterns Za, Zb, Zc, Zd) in which the circular dot patterns 401 are arranged is used. The inclination angle of the CIS 106 is derived with each of these patterns.

First, at S1401, the CPU 204 extracts X grid point coordinates from the reading position of data to be read (in other words, from the inclination angle correction value calculation processing pattern of interest). In the example in FIG. 13B, the first pattern of interest is the inclination angle correction value calculation processing pattern Za existing at the uppermost portion. Each time the processing at S1401 is performed repeatedly (NO at S1405→S1406→S1401), the pattern of interest changes to the inclination angle correction value calculation processing patterns Zb, Zc, and Zd. Each piece of processing at S1401 to S1409 is performed for each CIS 106.

At S1402, the CPU 204 sets, among the X grid point coordinates extracted at S1401, the coordinates closest to the center as the reference coordinates P and the coordinates around the reference coordinates P as the inclination angle correction value calculation coordinates A1 to AN.

At S1403, the CPU 204 performs straight-line approximation that takes the reference coordinates P as a transit point by using the reference coordinates P and the inclination angle correction value calculation coordinates A1 to AN, which are set at S1402.

At S1404, the CPU 204 calculates the inclination angle φ of the CIS 106 based on the slope a of the straight line calculated by performing straight-line approximation in accordance with the algorithm shown in FIG. 9 at S1403.

At S1405, the CPU 204 determines whether the processing corresponding to the circumference of the document conveyance roller has been completed. In a case where the results of the determination at this step are affirmative, the processing advances to S1407. On the other hand, in a case where the results of the determination at this step are negative, the processing advances to S1406.

At S1406, the CPU 204 advances the reading position of data to be read to the position at which the pattern to be read next exists.

At S1407, the CPU 204 averages the inclination angles φ of the CIS 106 calculated for each of the plurality of the inclination angle correction value calculation processing patterns (in this example, the inclination angle correction value calculation processing patterns Za to Zd).

At S1408, the CPU 204 calculates a correction value for correcting the inclination angle of the CIS 106 based on the inclination angle φ averaged at S1407.

At S1409, the CPU 204 saves the correction value for correcting the inclination angle calculated at S1408 in the memory 208 by writing it thereto.

<Effects and the Like of the Present Embodiment>

It is possible to apply the present embodiment to an image reading apparatus having only one CIS.

In the present embodiment, a plurality of inclination angles of the CIS 106 is derived for the length corresponding to one circumference of the document conveyance roller and the average of the derived plurality of inclination angles is calculated. Due to this, it is possible to suppress the influence of eccentricity of the document conveyance roller and accurately derive the inclination of the CIS 106. It is possible to accurately derive the inclination of the CIS 106 by making the interval between the circular dot patterns 401 as short as possible and extracting the predetermined number X of coordinates of the circular dot pattern 401 in a wider range because of the short interval.

Third Embodiment

In the present embodiment, even in a case where there is eccentricity in the document conveyance roller, the inclination angle of the CIS 106 is derived accurately. In detail, the inclination of the CIS 106 is derived by using the circular dot pattern (grid point) existing at each interval of the circumferential length of the roller along the conveyance direction of the upstream-side document conveyance roller 107.

Figure 15:
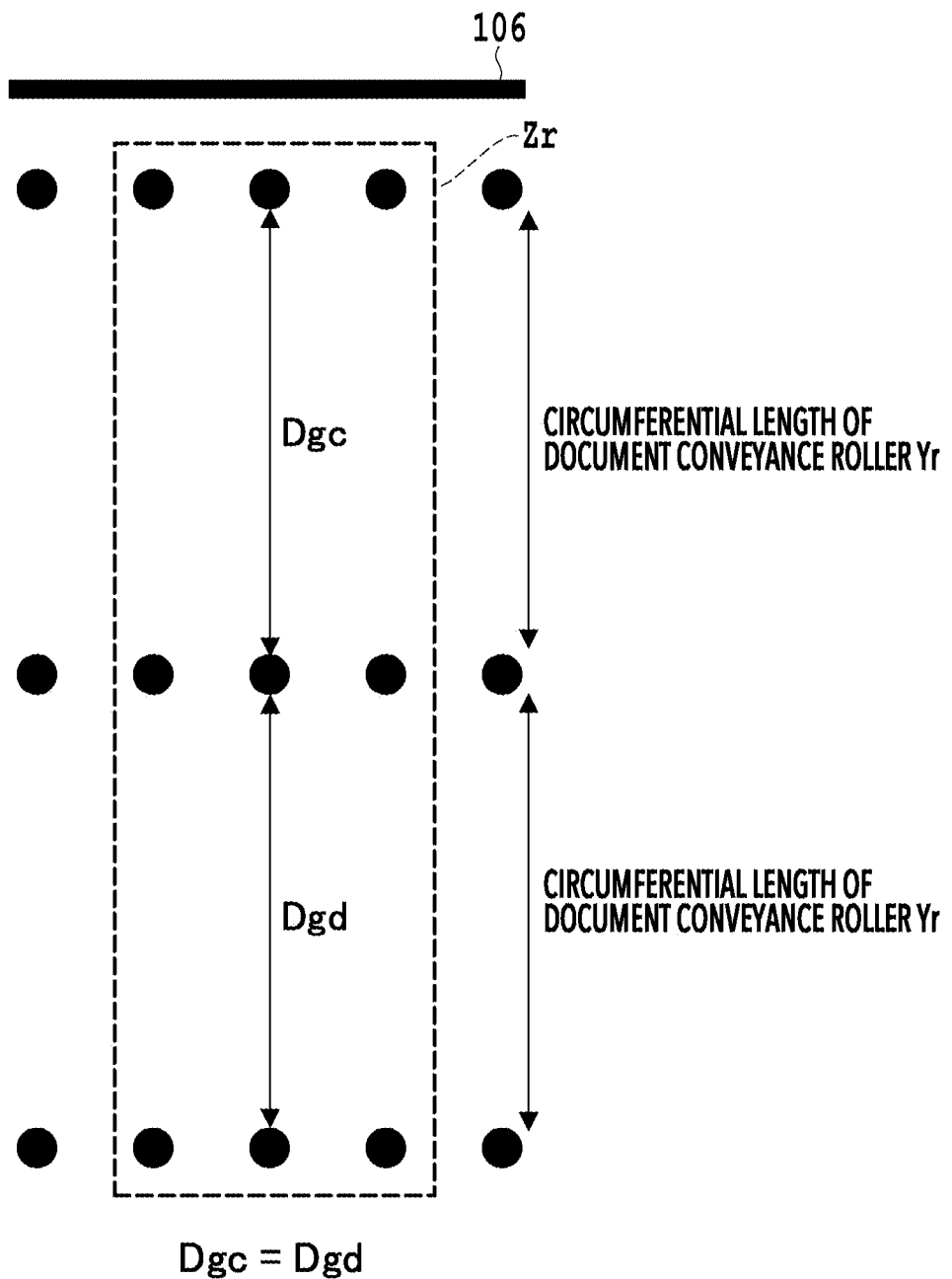
FIG. 15 is a diagram showing arrangement of circular dot patterns for suppressing the influence of eccentricity of a document conveyance roller in a third embodiment.

In the following, processing to accurately derive the inclination angle of the CIS 106 irrespective of the influence of eccentricity of the document conveyance roller by using the pattern that suppresses the influence of eccentricity of the document conveyance roller shown in FIG. 15 is explained. FIG. 15 shows reading results of an inclination angle correction value calculation processing pattern Zr in a case where there is eccentricity of the document conveyance roller. Regardless of the presence/absence of eccentricity of the document conveyance roller, the amount of conveyance does not change at the positions corresponding to integer multiples of the circumferential length, and therefore, misalignment in pattern reading does not occur. Because of this, a dot pattern interval Dgc and a dot pattern interval Dgd are equal and are the circumferential length Yr of the document conveyance roller.

As above, by using the inclination angle correction value calculation processing pattern Zr in which the circular dot pattern is arranged at each position corresponding to integer multiples of the circumferential length, it is possible to accurately derive the inclination of the CIS 106 without being affected by the eccentricity of the document conveyance roller. The flow of the derivation of the inclination angle of the CIS 106 in the present embodiment is the same as that in FIG. 10, and therefore, explanation is omitted. Further, it is possible to apply the present embodiment to an image reading apparatus having only one CIS.

Fourth Embodiment

In the present embodiment, a correction value other than the inclination angle is calculated by making use of the correction value calculation processing pattern used to derive the inclination angle of the CIS 106 shown in FIG. 4A. In detail, the sub scanning direction magnification due to a diameter error of the upstream-side document conveyance roller 107 is derived accurately. It is necessary to perform the derivation of the diameter error in the present embodiment after the derivation of the inclination angle of the CIS 106 explained in the first to third embodiments.

<Derivation Processing of Sub Scanning Direction Magnification>

In the following, the derivation of the sub scanning direction magnification in the present embodiment is explained by using FIG. 16.

At S1601, the CPU 204 determines a main scanning section, which is the derivation target of the sub scanning direction magnification. The main scanning section that is determined at this step is a main scanning area that is read by one of a plurality of within-CIS chips configuring the one CIS 106.

At S1602, the CPU 204 searches for the center coordinates of the circular dot pattern included in the main scanning section determined at S1601 in the sub scanning direction. Then, from among the center coordinates detected by the search, first, a reference point and a main scanning distance-measuring point are selected. The coordinates of the reference point and the main scanning distance-measuring point are the center coordinates of the circular dot pattern whose coordinates in the sub scanning direction on the chart are the same. As the reference point and the main scanning distance-measuring point, points in a positional relationship in which the points sandwich the pixel in between are selected, which is located at the center of the main scanning section of the sensor chip that performs reading of a predetermined main scanning section. Here, among the selected two center coordinates, the center coordinates located on the main scanning direction reference side (top pixel side) are selected as the reference point and the other center coordinates are selected as the main scanning distance-measuring point.

After the reference point and the main scanning distance-measuring point are selected, a sub scanning distance-measuring point is selected. As the sub scanning distance-measuring point, the point at the position is selected whose coordinates in the main scanning direction on the chart are the center coordinates of the same circular dot pattern and at which the distance between the reference point and the main scanning distance-measuring point and the distance between the reference point and the sub scanning distance-measuring point are the same on the chart.

Figure 17:
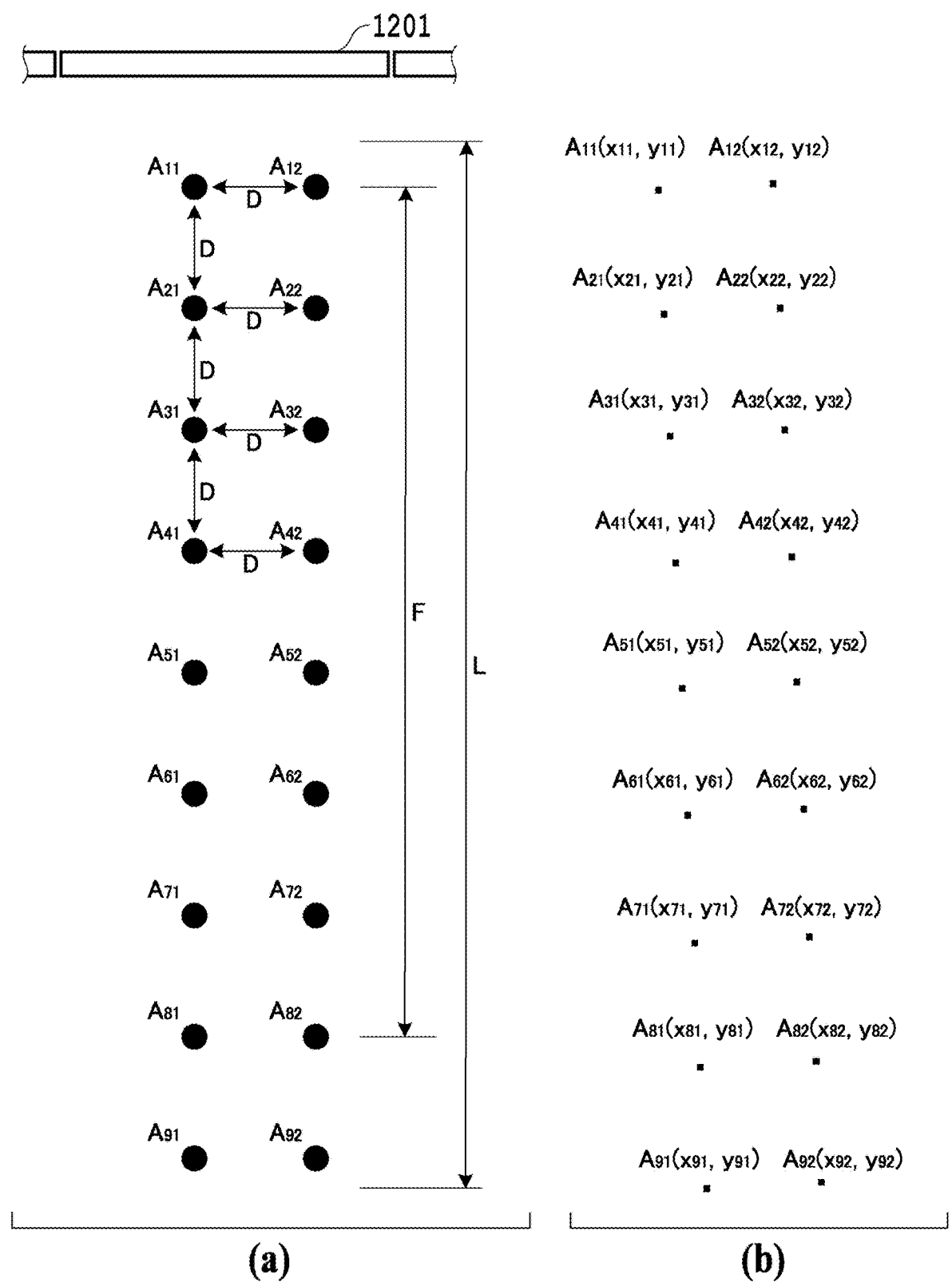
FIG. 17 is an image diagram showing a dot pattern used in the fourth embodiment and results of reading the dot pattern.

In FIG. 17, (a) shows a positional relationship between a chart on which circular dot patterns are printed and the chip 1201 within the CIS 106 that performs reading. In FIG. 17, (b) shows a positional relationship of the center coordinates of circular dot patterns, which are derived based on data obtained as the results of performing reading of the pattern shown in (a) in FIG. 17. Here, a state is shown where the center coordinates of the circular dot patterns are read with misalignment in the main scanning direction and the sub scanning direction, respectively, due to the inclination of the CIS 106 and the inclination of the chart in the set document. In a case where A11 (x11, y11) is selected as the reference point for the data such as this, A12 (x12, y12) is selected as the main scanning distance-measuring point and A21 (x21, y21) as the sub scanning distance-measuring point.

Figure 18:
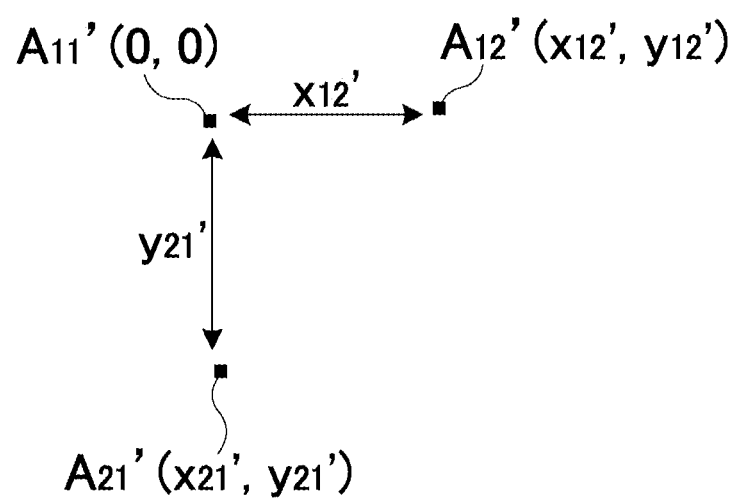
FIG. 18 is a diagram explaining coordinate conversion in the fourth embodiment.

At S1603, the CPU 204 performs conversion into relative coordinates of each distance-measuring point with the reference point A11 being taken as a center. In a case where the coordinates of A11 after conversion is taken to be A11' (0, 0), A12 is converted into A12' (x12', y12') and A21 into A21' (x21', y21'). At this time, x12'=x12−x11, y12'=y12−y11, x21'=x21−x11, and y21'=y21−y11 hold. In the following, specific explanation is given by using these coordinates. FIG. 18 shows an image of coordinates data after conversion.

At S1604, the CPU 204 performs correction for the coordinates converted at S1603 (in this example, coordinates A12', A21' after conversion) based on the inclination information on the CIS 106 obtained by the immediately previous correction value calculation. In a case where the inclination angle of the chip is found to be φ by the inclination detection of the CIS 106 performed immediately previously, A12', A21' are converted into A12" (x12", y12"), A21" (x21", y21"), respectively, with the coordinates A11"

being taken as the reference point. Here, in a case where the inclination of the CIS 106 or the chip 1201 is restricted mechanically and the tolerance does not affect the reading results, it is possible to omit the correction processing. By S1604, it is possible to find the distance (referred to as main scanning direction distance) x21" between the reference point and the converted main scanning distance-measuring point A12" and the distance (referred to as sub scanning direction distance) y12" between the reference point and the converted sub scanning distance-measuring point A21".

At S1605, the CPU 204 stores the main scanning direction distance x21" and the sub scanning direction distance y12", which are found at S1604, in the memory as the distance data on the reference point A11.

The processing described so far is the flow of the processing to acquire the conveyance data information on one reference point and the same processing is also performed for the other center coordinates arrayed in the sub scanning direction.

At S1606, the CPU 204 determines whether the center coordinates that can be selected as the reference point remain based on the stored center coordinates data. In a case where the results of the determination at this step are affirmative, the processing advances to S1607. On the other hand, in a case where the results of the determination at this step are negative (that is, in a case where the selectable center coordinates remain), the center coordinates of the circular dot pattern shifted in the sub scanning direction by the amount corresponding to one dot pattern from the center coordinates selected immediately previously as the reference point are selected.

In this manner, the center coordinates from A11 to A(N−1)1 are selected as the reference point and the distance to each distance-measuring point is calculated with the selected reference point being taken as the center, and the distance is stored in the memory. By A(N−1)1 being selected as the reference point, AN1 becomes the sub scanning distance-measuring point for A(N−1)1 and there is no data after that, and therefore, the processing is terminated. In a case where the distance data in all the sections is obtained, at S1607, the CPU 204 reads the data from the memory and finds the sub scanning direction magnification. It is possible to find the sub scanning direction magnification by formula (1) below.

$$a=(y21''+y31''+\ldots+yN1'')/(x12''+x22''+\ldots+x(N-1)2'') \quad \text{formula (1)}$$

It is possible to reflect the sub scanning direction magnification obtained by the above-described calculation in line reading start trigger generation timing, enlargement/reduction correction in image processing, and the like.

<Effects and the Like of the Present Embodiment>

It is possible to apply the present embodiment to an image reading apparatus having only one CIS.

According to the present embodiment, by making use of the correction value calculation processing pattern used at the time of deriving the inclination angle of the CIS 106 shown in FIG. 4A, it is also possible to highly accurately derive the sub scanning direction magnification due to the diameter error of the upstream-side document conveyance roller 107.

Fifth Embodiment

<Problem of the Present Embodiment>

Figure 19A:
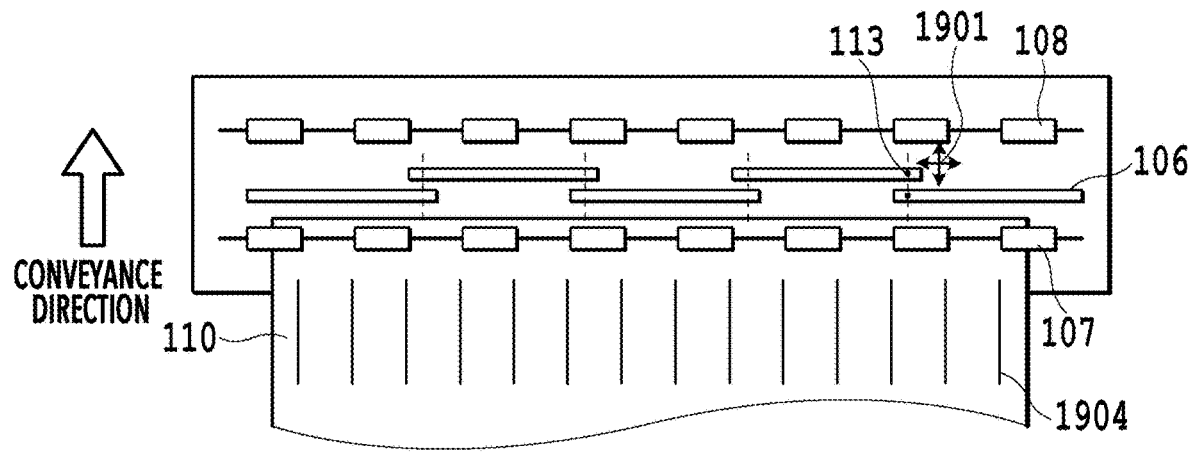
FIG. 19A to FIG. 19C are diagrams showing a general configuration of an image reading apparatus having a plurality of line image sensors and an example of reading results.
Figure 19B:
Figure 19C:
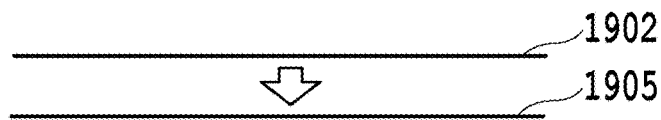

FIG. 19A to FIG. 19C are diagrams for explaining the problem of the present embodiment, showing an example of reading after connecting processing by the conventional calibration processing and an example of reading after ideal connecting processing.

Conventionally, as shown in FIG. 19A, in order to perform calibration, reading is performed by using a combination of straight-line patterns 1904. After that, from the results of reading, an inclination (Φ) of each CIS 106 is derived and then the connecting position 113 (X, Y) between the CIS's 106 is derived.

However, in a case where the combination of the straight-line patterns 1904 is used for the derivation of the inclination of the CIS 106, there is an influence of the inclination of the document and the diameter error of the roller, and therefore, resulting in the error factor at the time of derivation of the inclination of the CIS 106. In a case where the connecting position 113 is derived in a state where there is an error at the time of derivation of the inclination of the CIS 106, it is not possible to perform the connecting processing correctly. For example, as shown in FIG. 19B, in a case where the straight-line pattern 1902 is read, the line is read as the zigzag line 1903 as a result that misalignment in connecting position occurs due to the error component at the time of derivation of the inclination of the CIS 106.

Consequently, an object of the present embodiment is to implement the connecting processing between the CIS's 106 irrespective of the error component at the time of reading.

The configuration of the scanner 100, the calibration processing, the processing to read the correction value calculation processing pattern and calculate the correction value, the derivation of the center coordinates of the circular dot pattern, and the derivation of the inclination angle of the CIS 106 in the present embodiment are the same as those in the first embodiment (see FIG. 1A to FIG. 10).

<Connecting Position Derivation Processing>

Figure 21A:
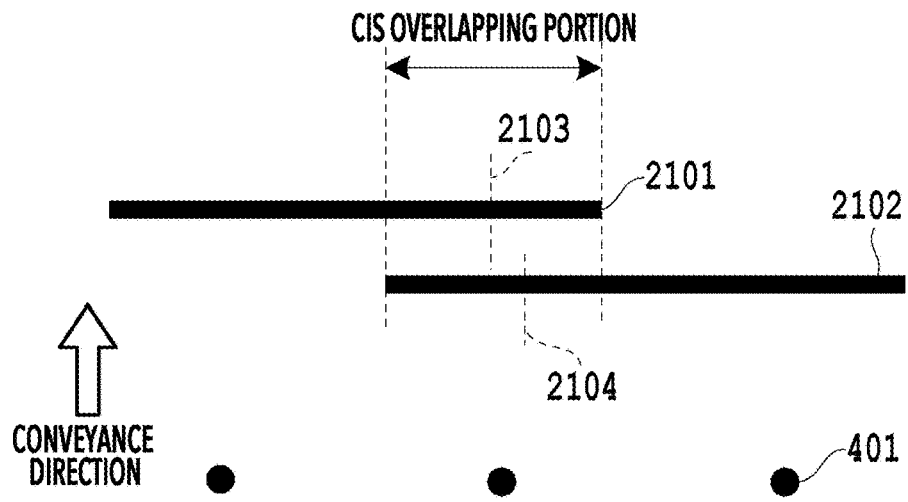
FIG. 21A to FIG. 21C are diagrams explaining derivation of a connecting position between CIS's in the fifth embodiment.
Figure 21B:
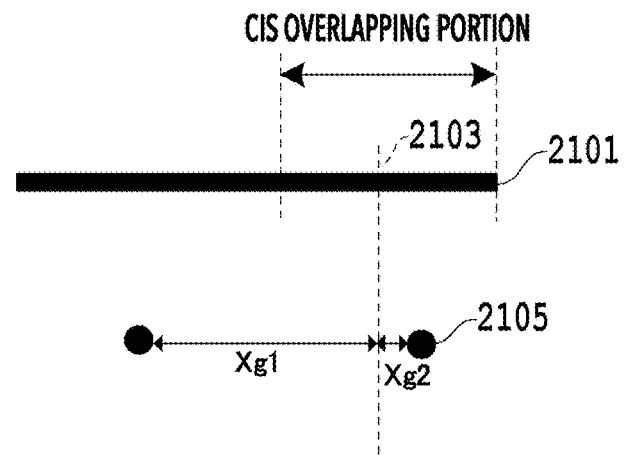
Figure 21C:
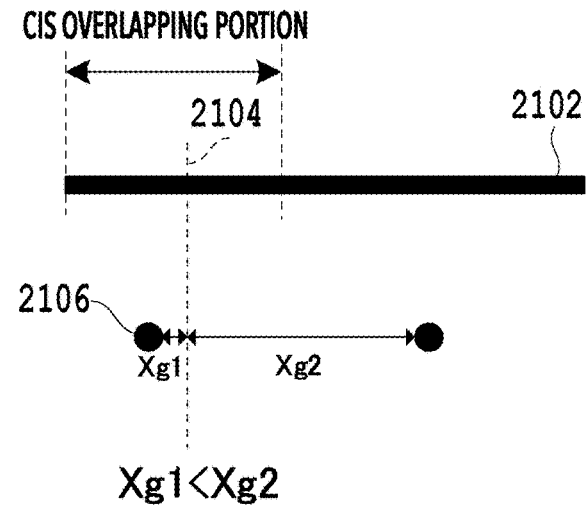
Figure 22:
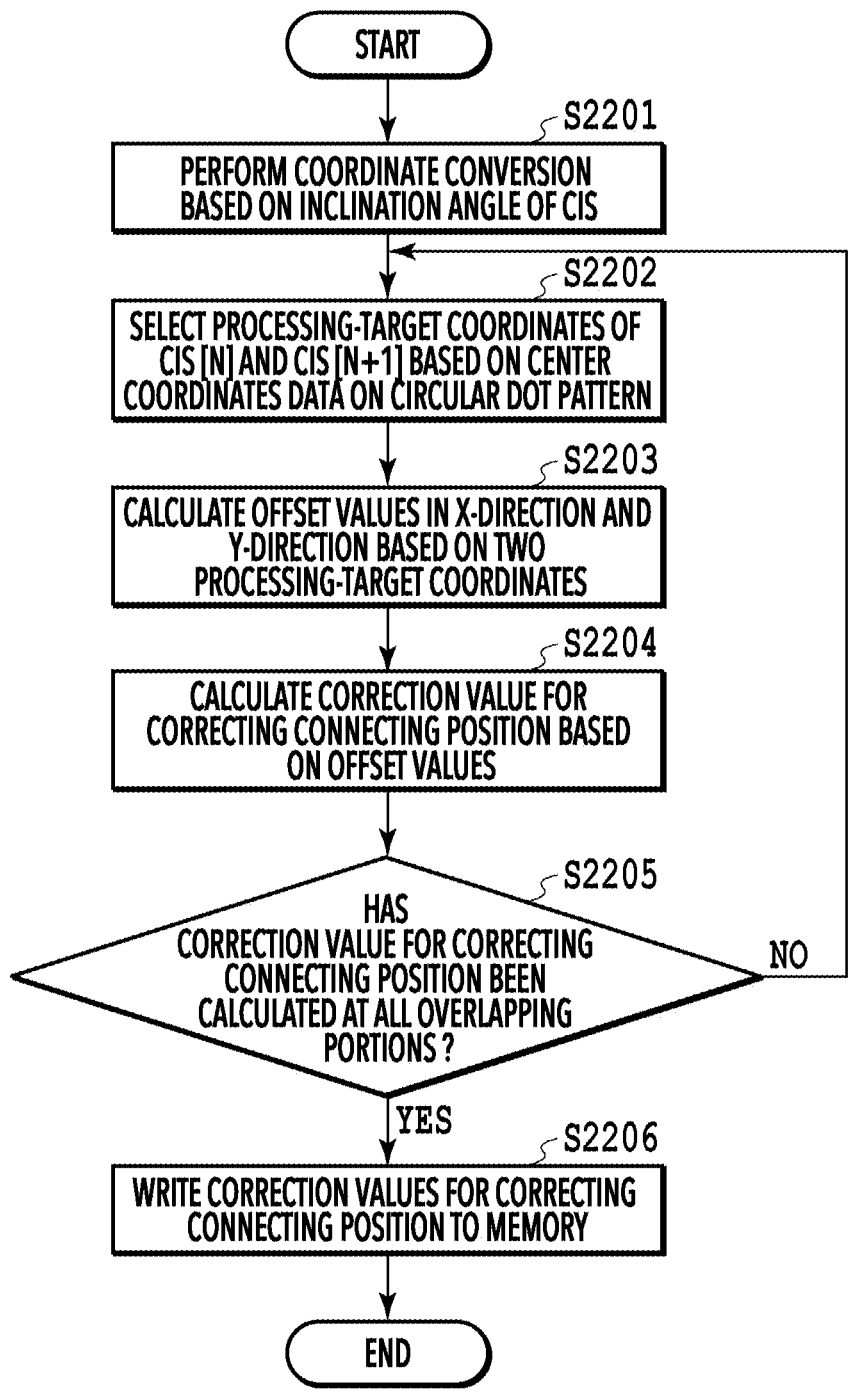
FIG. 22 is a flowchart showing a flow of derivation of a correction value for correcting a connecting position in the fifth embodiment.

In the following, connecting position derivation processing in the present embodiment is explained by using FIG. 20A to FIG. 25. FIG. 20A to FIG. 20C are diagrams showing coordinate conversion based on the inclination angle of the CIS 106, which is obtained by the immediately previous correction value calculation. FIG. 21A to FIG. 21C are diagrams showing an outline of the derivation of the connecting position between the CIS's 106. FIG. 22 is a flowchart showing a flow of the connecting position derivation.

Figure 7:
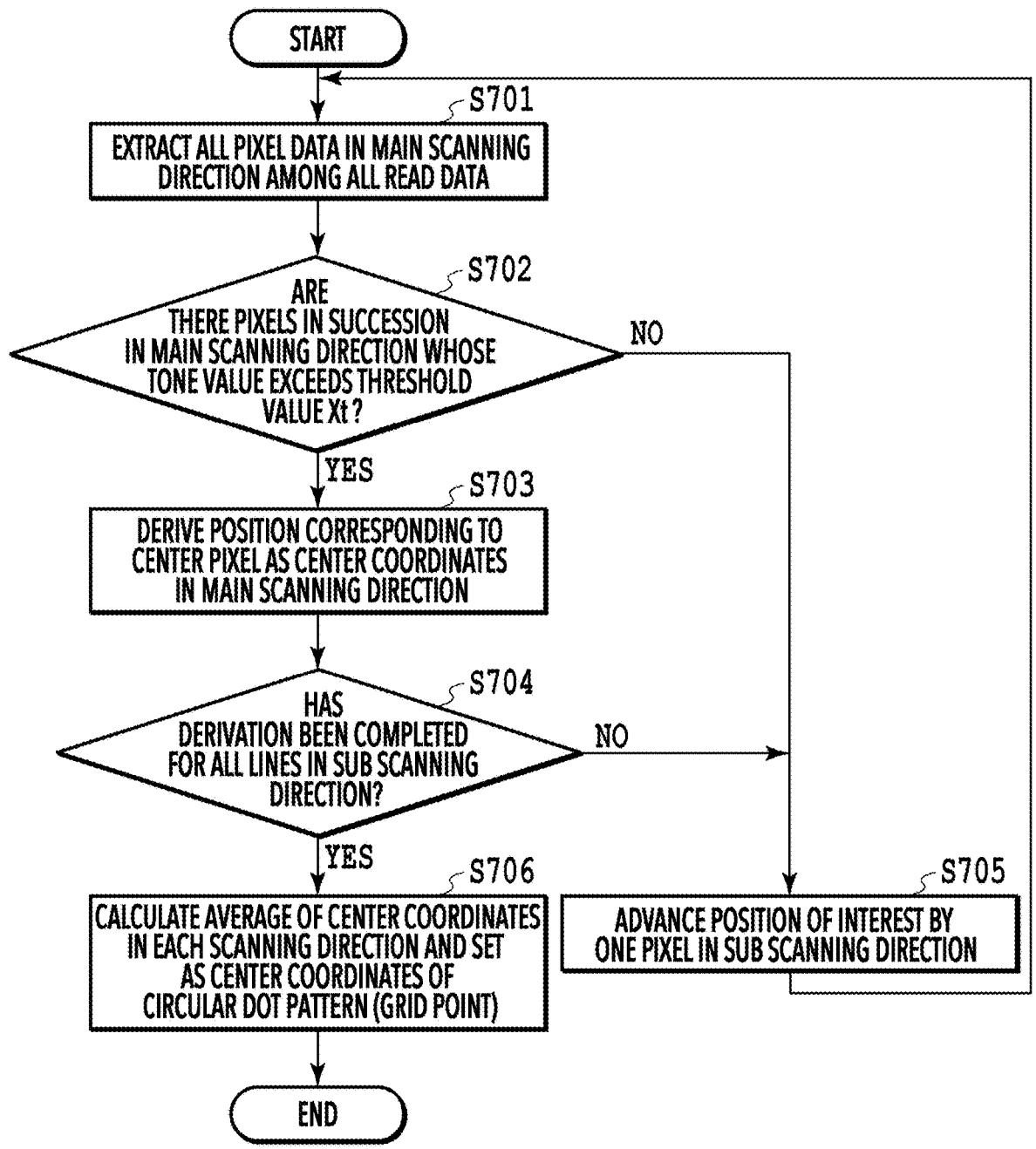
FIG. 7 is a flowchart of processing to derive center coordinates of the circular dot pattern in the first embodiment.

First, at S2201, the CPU 204 performs, based on the inclination angle of the CIS 106 obtained by the immediately previous correction value calculation, coordinate conversion to convert the center coordinates 601 of the circular dot pattern 401 explained in FIG. 6 and FIG. 7 into the state before the change due to the inclination of the CIS 106. FIG. 20A is a diagram showing the change in the center coordinates 601 of the circular dot pattern 401 due to the inclination angle φ of the CIS 106. FIG. 20B is a diagram in a case where the coordinate conversion to convert the center coordinates 601 of the circular dot pattern 401 into the state before the change due to the inclination of the CIS 106 is performed by using the inclination angle φ of the CIS 106, which is calculated by the immediately previous correction value calculation. The coordinate conversion based on the inclination angle φ of the CIS 106 is performed in accordance with mathematical formulas shown in FIG. 20C.

Here, an aspect is explained in which the connecting position is derived by performing the coordinate conversion for the center coordinates 601 of the circular dot pattern 401. However, it may also be possible to derive the connecting position by reading the document 110 again on which the circular dot pattern 401 is printed in the state where the correction value of the inclination of the CIS 106 is applied, which is obtained by the immediately previous correction value calculation.

At S2202, the CPU 204 selects, based on the center coordinates 601 of the circular dot pattern 401 for which the coordinate conversion has been performed at S2201, processing-target coordinates of an Nth CIS (described as CIS [N]) 2101 and an (N+1)th CIS (described as CIS [N+1]) 2102. FIG. 21A is a diagram showing arrangement of the circular dot patterns 401 for the overlapping portion of a plurality of the CIS's 106. FIG. 21B shows the results of reading of the CIS [N] 2101 and FIG. 21C shows the results of reading of the CIS [N+1] 2102. As shown in FIG. 21B, for the data read by the CIS [N] 2101, the center coordinates 601 of the circular dot pattern 401 closest from a connecting reference position 2103 of the CIS [N] determined in advance as a fixed value are selected as processing-target coordinates 2105 of the CIS [N]. Similarly, as shown in FIG. 21C, for the CIS [N+1] 2102 also, the center coordinates 601 of the circular dot pattern 401 closest from a connecting reference position 2104 of the CIS [N+1] are selected as processing-target coordinates 2106 of the CIS [N+1].

At S2203, the CPU 204 calculates offset values in the X-direction and the Y-direction based on the difference in the X-coordinate and the Y-coordinate between the processing-target coordinates 2105 of the CIS [N] and the processing-target coordinates 2106 of the CIS [N+1], which are selected at S2202.

At S2204, the CPU 204 calculates the correction value for correcting the connecting position based on the offset values in the X-direction and the Y-direction, which are calculated at S2203.

At S2205, the CPU 204 determines whether the correction value for correcting the connecting position has been calculated at all the overlapping portions of the plurality of the CIS's 106. In a case where the results of the determination at this step are affirmative, the processing advances to S2206. On the other hand, in a case where the results of the determination at this step are negative (that is, the calculation of the correction value for correcting the connecting position has not been completed at all the overlapping portions of the plurality of the CIS's 106), the processing returns to S2202 and the calculation of the correction value for correcting the connecting position of the next overlapping portion is performed.

At S2206, the CPU 204 saves the correction values for correcting the connecting position, which are derived for all the overlapping portions of the plurality of the CIS's 106, in the memory 208 by writing them thereto.

As a method of applying the found correction value, it is possible to adopt a method of performing reading while changing the access portion of the memory each time of reading based on the correction value written to the memory at S2206, a method of physically adjusting the position of the CIS 106, and the like.

Further, in order to suppress the influence of a quantization error at the time of derivation of the center coordinates 601 of the circular dot pattern 401 in a case where the connecting position is derived, it is recommended to arrange a plurality of the circular dot patterns 401 for the overlapping portion. Then, in the arrangement configuration described previously, at S2202, by using the connecting reference positions of the CIS [N] and the CIS [N+1], the processing-target coordinates 2105, 2106 of the CIS [N] and the CIS [N+1], which correspond to the number of grid points read at the overlapping portion, are selected respectively. In a case where the correction value for correcting the connecting position is calculated at S2204, the results of averaging a plurality of offset values in the X-direction and the Y-direction respectively calculated at S2203 are used.

Figure 23A:
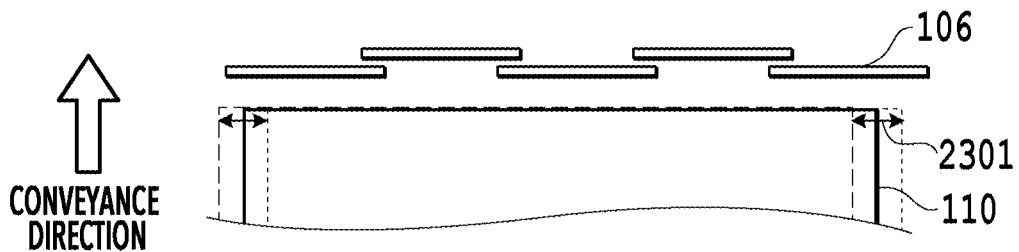
FIG. 23A to FIG. 23C are diagrams showing arrangement of circular dot patterns in a case where there is misalignment at the time of document setting.
Figure 23B:
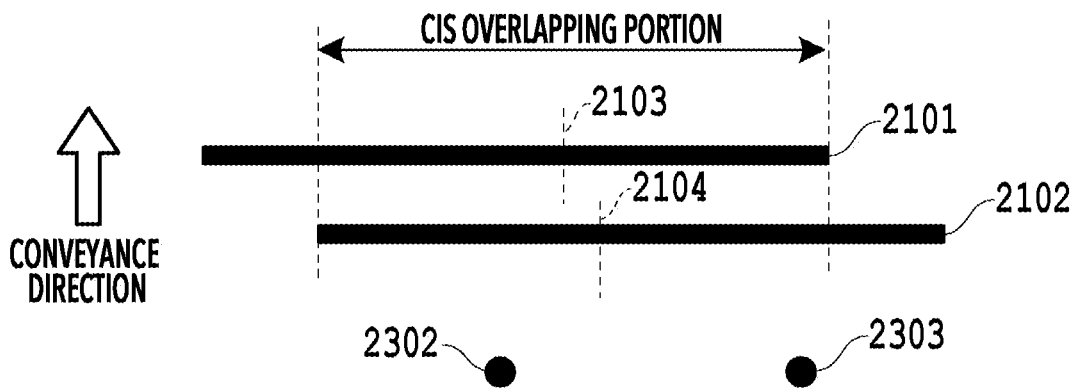
Figure 23C:
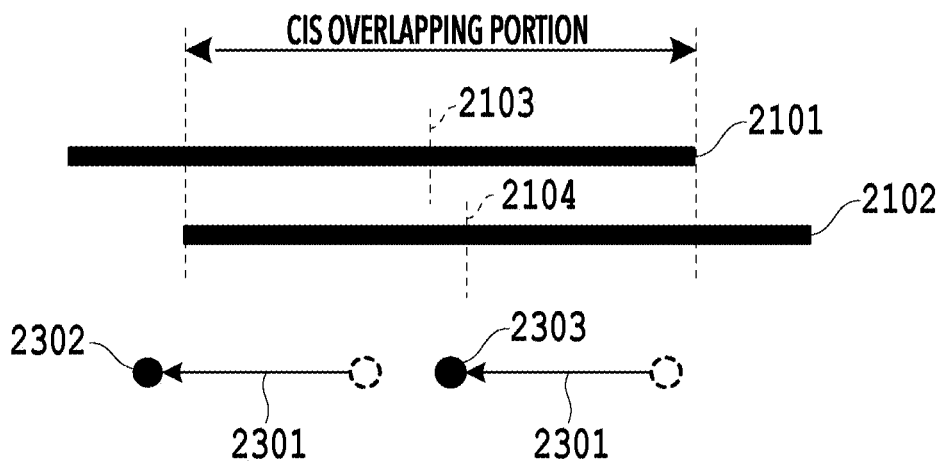

FIG. 23A to FIG. 23C show the arrangement of the circular dot patterns in a state where there is misalignment at the time of document setting 2301. Here, a case is discussed where the misalignment in document setting 2301 occurs at the time of a user setting the document 110 as shown in FIG. 23A. In the case such as this, with the configuration in which only the one circular dot pattern 401 is arranged for the overlapping portion of the CIS 106 as shown in FIG. 21A, there is a possibility that not even one pattern is included in the overlapping portion. As a countermeasure against this, as shown in FIG. 23B, two patterns, that is, a first connecting position correction value calculation processing pattern 2302 and a second connecting position correction value calculation processing pattern 2303 are arranged so as to be included for the overlapping portion of the CIS 106. By the countermeasure shown in FIG. 23B, even in a case where the misalignment at the time of document setting 2301 exists as shown in FIG. 23C, it is made possible to derive the connecting position between the CIS's 106.

Figure 24A:
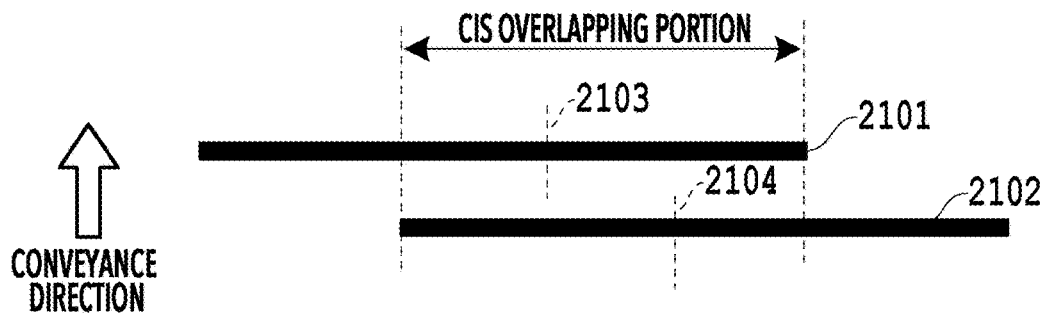
FIG. 24A to FIG. 24C are diagrams explaining a countermeasure against erroneous derivation of a connecting position in the fifth embodiment.
Figure 24B:
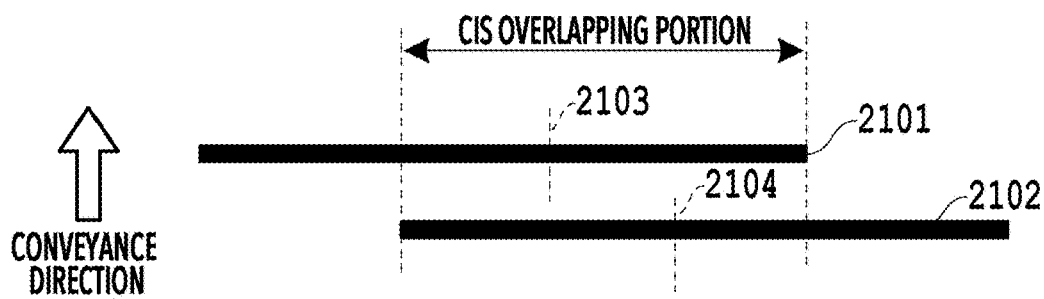
Figure 24C:
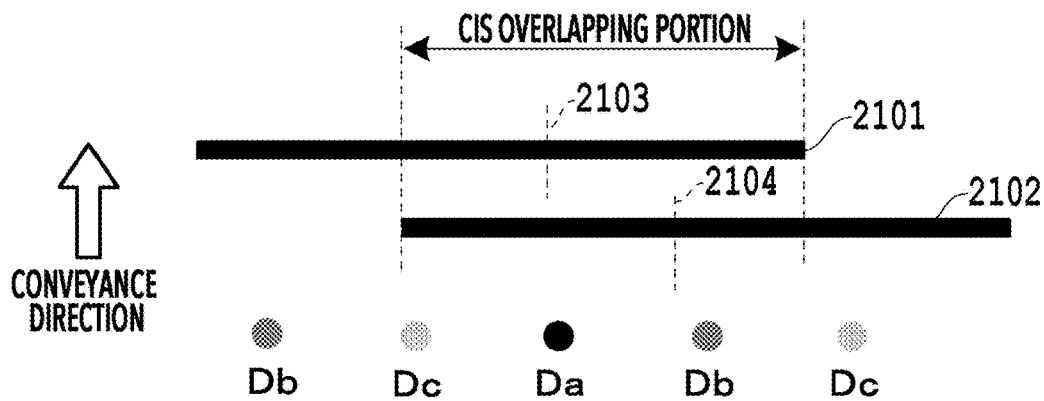

FIG. 24A to FIG. 24C show pattern arrangement that prevents erroneous derivation of the connecting position in the configuration in which a plurality of dot patterns is arranged for the overlapping portion of the CIS 106. There is a case where a plurality of dot patterns is arranged for the overlapping portion of the CIS 106 as shown in FIG. 24A in order to suppress the influence of the quantization error described previously, or as the countermeasure against the influence of misalignment at the time of document setting. Ideally, it is desirable for the connecting reference position 2103 of the CIS [N] and the connecting reference position 2104 of the CIS [N+1] to be located on the same straight line in the document conveyance direction (to be the same in the main scanning direction). However, actually, the positions of the plurality of the CIS's 106 misalign due to the mechanical attachment tolerance, and therefore, these reference positions misalign from the straight line. Because of this, depending on the amount of misalignment of the CIS position, there is a possibility that the same dot pattern cannot be selected at S2202, such as a case where a dot pattern 2401 closest from the reference coordinates of the CIS [N] and a dot pattern 2402 closest from the reference coordinates of the CIS [N+1] are selected.

FIG. 24B shows a configuration including a plurality of dot patterns whose sizes are different from one another. FIG. 24C shows a configuration including a plurality of dot patterns whose optical densities are different from one another. By adopting the configuration in FIG. 24B, for example, in a case where a dot pattern is selected, which is closest from the connecting reference position 2103 of the CIS [N] and the connecting reference position 2104 of the CIS [N+1] and whose diameter is larger than Xb, it is made possible to select the same pattern at S2202. Also by adopting the configuration in FIG. 24C, for example, in a case where a dot pattern is selected, which is closest from the connecting reference position 2103 of the CIS [N] and the connecting reference position 2104 of the CIS [N+1] and whose optical density is higher than Db, it is made possible to select the same pattern at S2202.

By using the configuration as explained above in which a plurality of dot patterns is arranged for the overlapping portion of the CIS 106, it is made possible to suppress erroneous derivation of the connecting position. Dot patterns whose colors are made different from one another are also effective for suppressing erroneous derivation other than the dot patterns whose sizes or optical densities are made different from one another.

Figure 25:
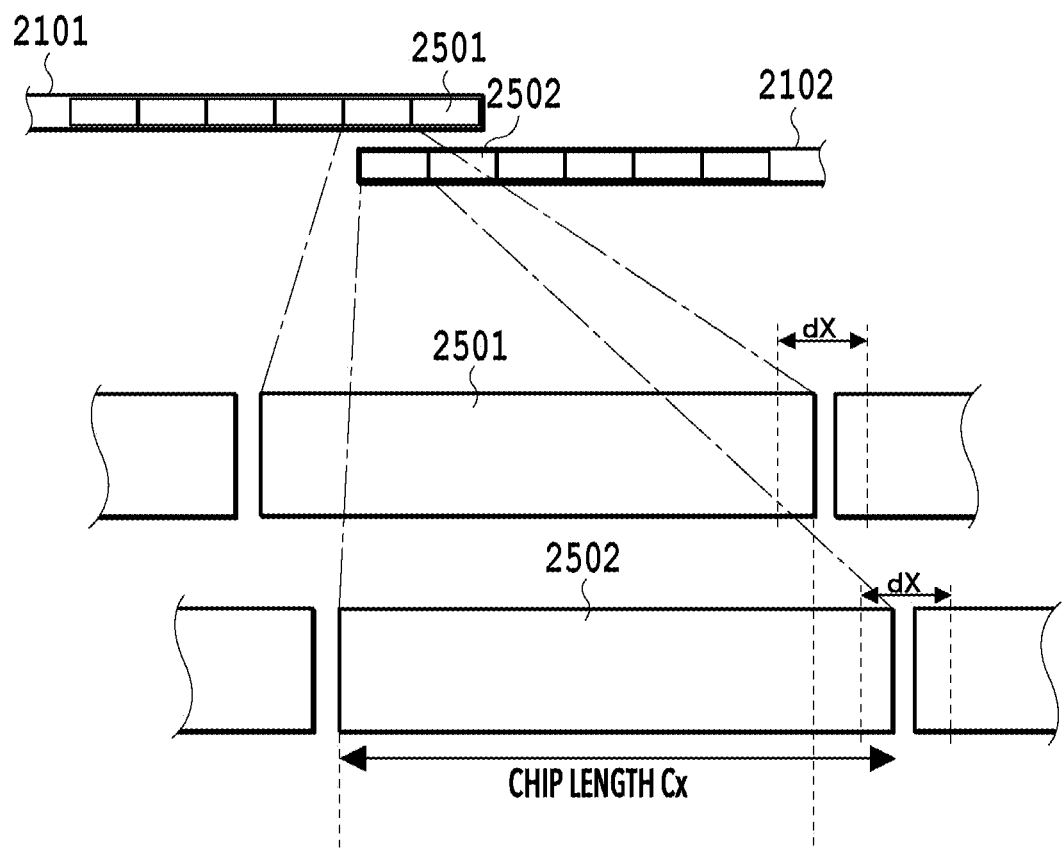
FIG. 25 is a diagram showing an internal structure of the CIS and arrangement of circular dot patterns in the fifth embodiment.

FIG. 25 shows the internal structure of the CIS [N] 2101 and the CIS [N+1] 2102 and the arrangement of the circular dot patterns 401. Generally, the CIS 106 includes a plurality of chips and in the CIS [N] 2101, the positional misalignment dx between chips exists for each internal chip 2501 and in the CIS [N+1], it exists for each internal chip 2502. As shown in FIG. 25, for the overlapping portion (referred to as chip overlapping portion) of the chip 2501 within the CIS [N] and the chip 2502 within the CIS [N+1], the circular dot pattern 401 is arranged. Due to this, it is possible to derive the connecting position between the CIS's 106 by ignoring the influence of the gap dx between chips. In a case where the influence due to the misalignment in document setting 2301 shown in FIG. 23A to FIG. 23C is suppressed, it is sufficient to arrange the two circular dot patterns 401 for the overlapping portion of the chip 2501 within the CIS [N] and the chip 2502 within the CIS [N+1].

<Effects of the Present Embodiment>

As explained above, in the present embodiment, irrespective of the inclination at the time of document setting and the error component at the time of reading, such as the diameter error of the document conveyance roller, the connecting position between the CIS's 106 is derived in the state where the inclination of the CIS 106 is derived accurately. Due to this, it is possible to implement highly accurate connecting processing between CIS's. Further, it is possible to make use of the same pattern as that at the time of derivation of the inclination of the CIS 106 in a case where the connecting position between the CIS's 106 is derived, and therefore, it is possible to reduce the chart creation cost.

Sixth Embodiment

In the present embodiment, even in a case where there is eccentricity of the document conveyance roller, the connecting position between the CIS's 106 is derived accurately. In detail, by reading a plurality of circular dot patterns arranged along the conveyance direction of the upstream-side document conveyance roller 107, the connecting position between the CIS's 106 is derived.

Figure 27:
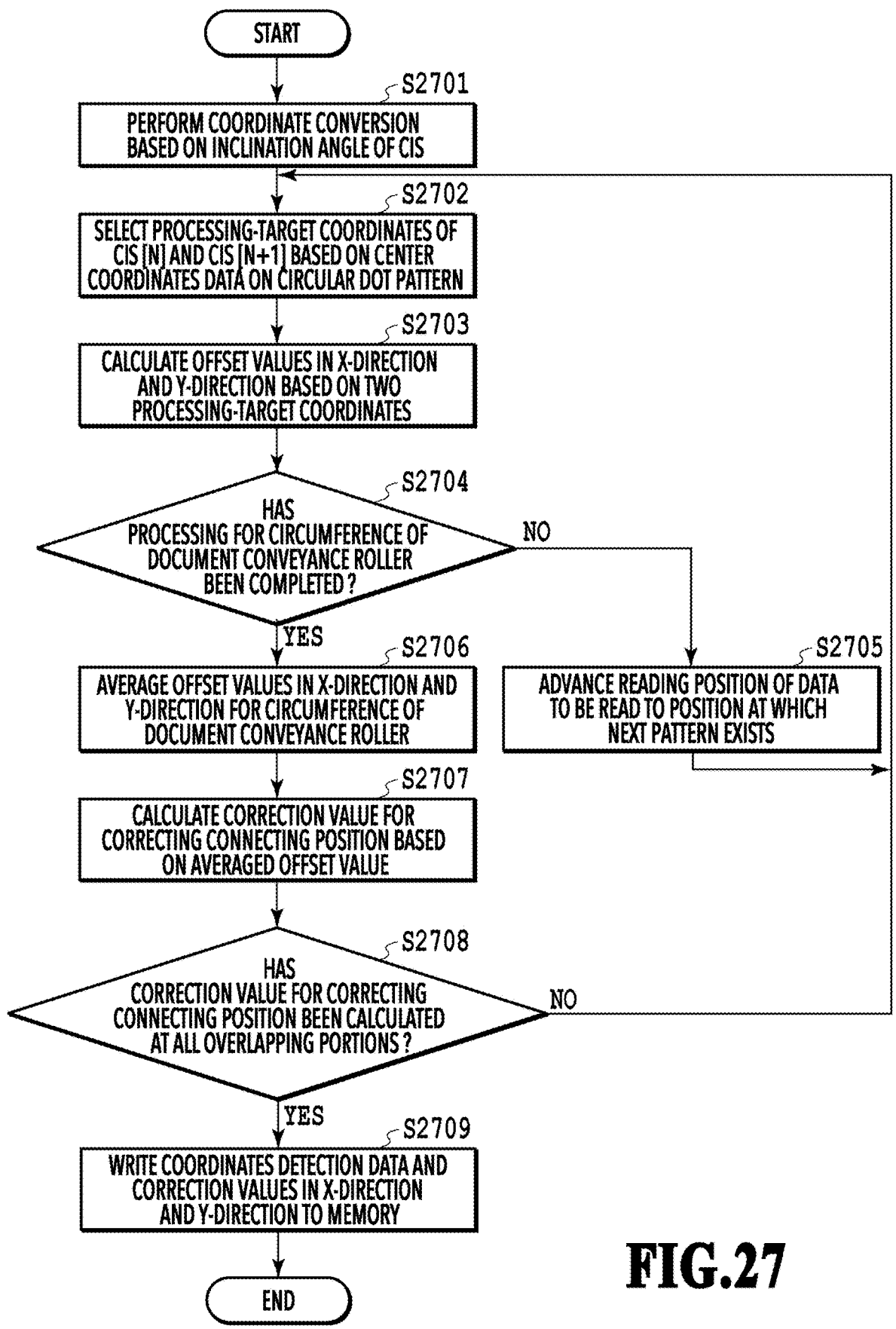
FIG. 27 is a flowchart of processing for suppressing the influence of eccentricity of the document conveyance roller in the sixth embodiment.

In the following, derivation of the connecting position between the CIS's 106 in the present embodiment is explained by using FIG. 26A, FIG. 26B, and FIG. 27. FIG. 26A and FIG. 26B are diagrams explaining a pattern for suppressing the influence of eccentricity of the document conveyance roller. FIG. 27 is a flowchart of processing for suppressing the influence of eccentricity of the document conveyance roller.

FIG. 26A shows the results of reading of a pattern in a case where there is eccentricity of the document conveyance roller. By the center position of rotation misaligning due to the eccentricity of the document conveyance roller, the amount of conveyance of the document conveyance roller changes. Because of this, on the circumference of the document conveyance roller, in addition to the position Oa at which the amount of conveyance is average, the position Ob at which the amount of conveyance is large and the position Oc at which the amount of conveyance is small exist. An example of the results of reading the circular dot pattern 401 in the state where the amount of conveyance changes depending on the position as described above is the pattern shown in FIG. 26A. By the reading at the position Ob at which the amount of conveyance of the document conveyance roller is large, the interval Dga between the circular dot patterns in close proximity is short. On the other hand, by the reading at the position Oc at which the amount of conveyance is small, the interval Dgb between the circular dot patterns in close proximity is wide. In the state such as this, it is not possible to accurately derive the connecting position between the CIS's 106.

FIG. 26B shows a derivation method of the connecting position between the CIS's 106 for suppressing the influence of eccentricity of the document conveyance roller. The connecting position between the CIS's 106 is derived by using a circular dot pattern group (referred to as connecting position derivation pattern) 2601 in which the circular dot patterns 401 are arranged one on top of another for the circumferential length Yr of the document conveyance roller. S2701 to S2703 are the same as S2201 to S2203 in FIG. 22, and therefore, explanation is omitted.

At S2704, the CPU 204 determines whether the processing to calculate the offset values in the X-direction and the Y-direction at S2703 has been completed for the circumference of the document conveyance roller. In a case where the results of the determination at this step are affirmative, the processing advances to S2706. On the other hand, in a case where the results of the determination at this step are negative, the processing advances to S2705.

At 2705, the CPU 204 advances the reading position of data to be read to the position at which the circular dot pattern to be read next exists.

At S2706, the CPU 204 averages the offset values in the X-direction and the Y-direction respectively for the circumference of the document conveyance roller, which are calculated at S2702 to 2705.

At S2707, the CPU 204 calculates the correction value for correcting the connecting position based on the averaged offset value in the X-direction and the Y-direction, which is calculated at S2706.

At 2708, the CPU 204 determines whether the correction value for correcting the connecting position has been calculated at all the overlapping portions. In a case where the results of the determination at this step are affirmative, the processing advances to 2709. On the other hand, in a case where the results of the determination at this step are negative (that is, in a case where the calculation of the correction value for correcting the connecting position has not been complete at all the overlapping portions of the plurality of the CIS's 106), the processing returns to S2702 and the calculation of the correction value for correcting the connecting position of the next overlapping portion is performed.

At S2709, the CPU 204 saves the correction values for correcting the connecting position, which are derived for all the overlapping portions of the plurality of the CIS's 106, in the memory 208 by writing them thereto.

<Effects of the Present Embodiment>

As explained above, in the present embodiment, the plurality of offset values in the X-direction and the Y-direction between the CIS's 106 is derived for the circumference of the document conveyance roller, and due to this, it is possible to suppress the influence of eccentricity of the document conveyance roller at the time of derivation of the connecting position between the CIS's 106. By shortening the interval between the circular dot patterns 401 in the conveyance direction, it is possible to use the coordinates of the many circular dot patterns 401 at the time of derivation of the connecting position between the CIS's 106, and therefore, it is possible to accurately derive the connecting position between the CIS's 106.

Seventh Embodiment

Figure 31A:
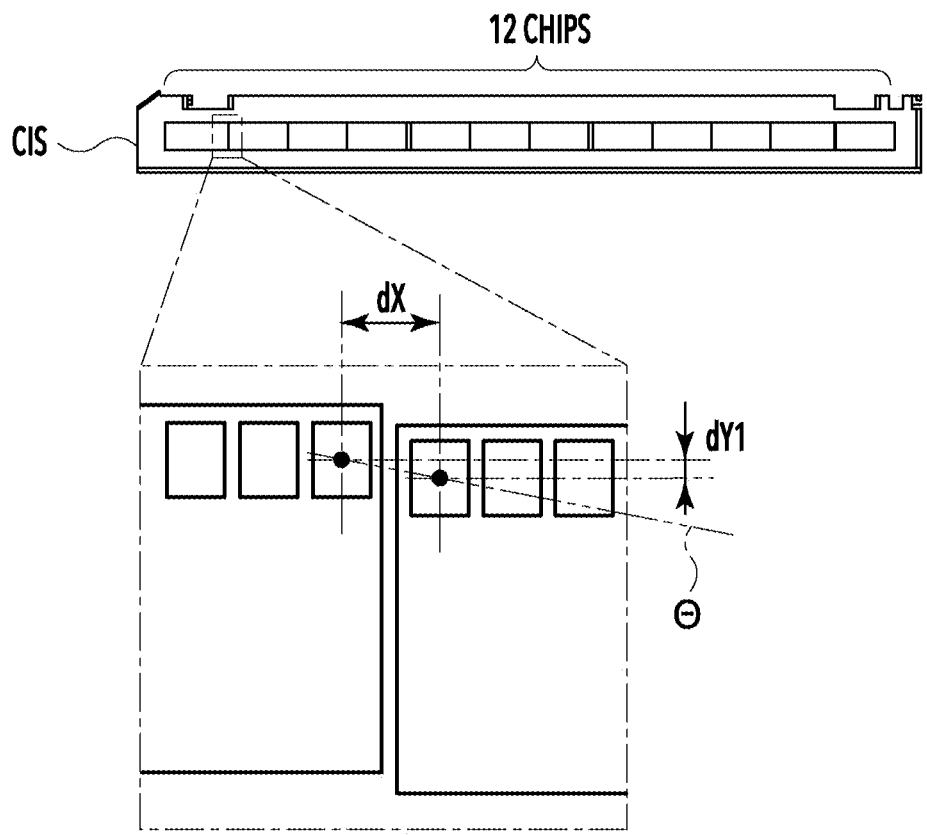
FIG. 31A and FIG. 31B are diagrams explaining a problem in the seventh embodiment.
Figure 31B:
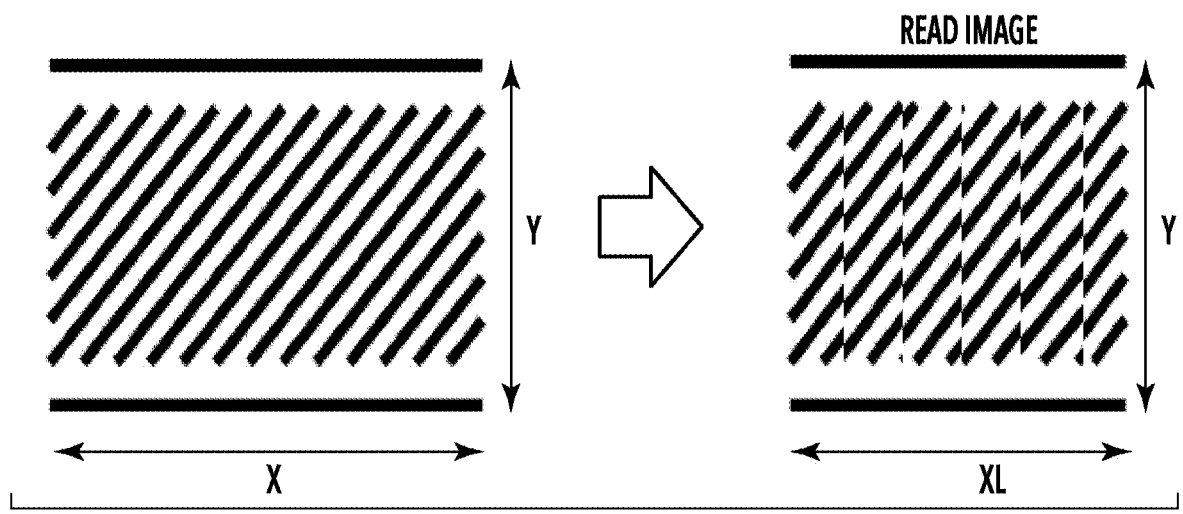

In the line image sensor including a plurality of chips, there is a case where there exists a manufacturing inter-chip step. FIG. 31A and FIG. 31B are diagrams explaining the inter-chip step in the line image sensor. In the present embodiment, as in the embodiment described previously, explanation is given on the assumption that the line image sensor is the CIS type and one line image sensor includes 12 chips, but the type and the number of constituent chips are not limited to those.

The inter-chip step refers to an amount of misalignment dY1 in the sub scanning direction in FIG. 31A. In a case where the inclination angle is represented by $\Theta$ and the ideal value of the inter-chip distance in the main scanning direction is represented by dx, a distance dX in the main scanning direction in this case is $dX = dx \times \cos \Theta$. Consequently, $dX < dx$, and therefore, the inter-chip step will also affect the distance in the main scanning direction. For example, in a case where a pattern including horizontal lines and oblique lines as shown in FIG. 31B is read, the results of the reading will be a length of XL to which an original main scanning direction length X is compressed.

The tolerance of the inter-chip step such as this depends on the manufacturing specifications of the line image sensor and is determined by taking into consideration the yield and cost. For example, in a certain kind of line mage sensor, dY1 has a value of 30 µm (dY1=30 µm). However, in the implementation of reading with a higher accuracy demanded in recent years, the reading error between adjacent chips resulting from the inter-chip step is a problem that cannot be ignored.

Consequently, an object of the present embodiment is to implement correction in accordance with the inter-chip step without the need to improve the current manufacturing specifications.

<Correction Value Calculation Processing Pattern>

Figure 4B:
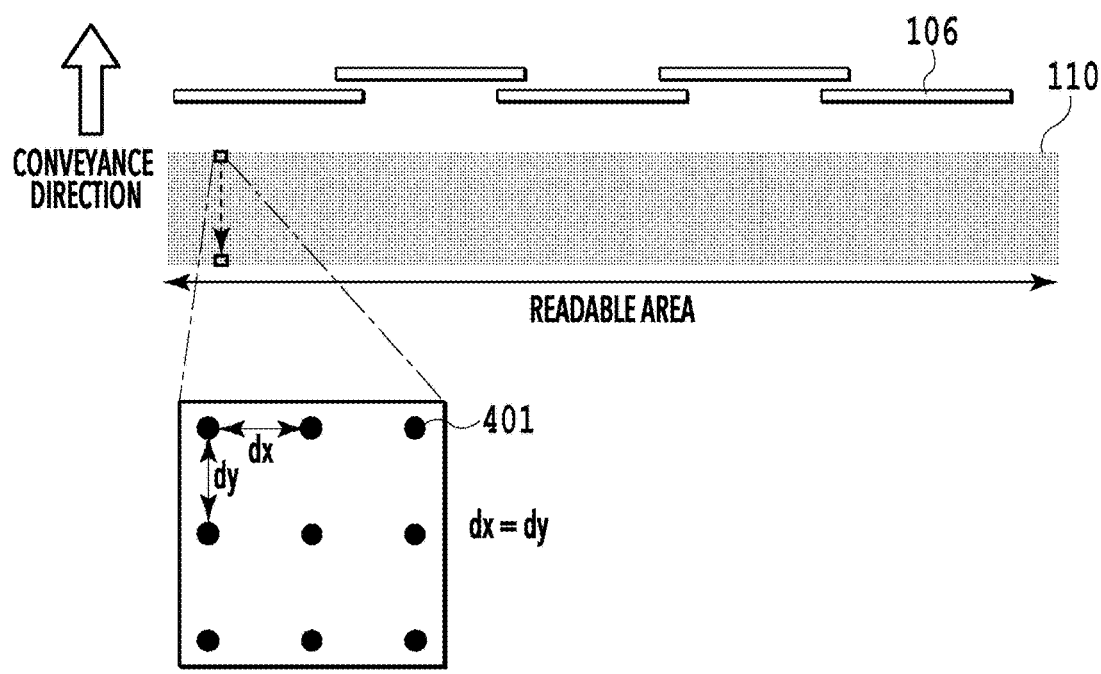

In the following, a correction value calculation processing pattern (calibration chart) used in the present embodiment is explained by using FIG. 4B. FIG. 4B is a diagram showing a correction value calculation processing pattern in the present embodiment.

As shown in FIG. 4B, on the document 110, the circular dot patterns 401 are printed at equal intervals (dx=dy) in the main scanning direction and the sub scanning direction. The interval dx in the main scanning direction and the interval dy in the sub scanning direction are less than the chip size Cx of the sensor. These circular dot patterns 401 are read by conveying the document by using the upstream-side document conveyance roller 107 and the downstream-side document conveyance roller 108. As the pattern arrangement on the document, a plurality of the circular dot patterns 401 is printed across the width of the readable area in the main scanning direction and printed so as to cover the circumference of the upstream-side document conveyance roller 107 and the downstream-side document conveyance roller 108 in the sub scanning direction.

<Derivation of Main Scanning Direction Magnification Due to Inter-Chip Step>

In the present embodiment, by using the pattern shown in FIG. 4B, calibration accompanied by various correction value calculations is performed. The flow of the calibration value calculations in the present embodiment is basically the same as that in the first embodiment (see FIG. 5).

By using the pattern shown in FIG. 4B, the center coordinates of the circular dot pattern 401 are derived (S501) and following this, the processing at S502 to S506 is performed. The contents of the present embodiment are those relating to the derivation processing of the main scanning direction magnification due to the inter-chip step at S505, and therefore, explanation of details of other than S505 is omitted appropriately.

At S502, the inclination angle is calculated by making use of that a plurality of circular dot patterns is arranged concentrically so that the sum of the coordinates from the reference coordinates is zero. At S503 and the S504, based on the ratio of distances between the circular dot patterns, the variation of the amount of conveyance in the sub scanning direction is calculated.

Before performing the derivation processing of the main scanning direction magnification due to the inter-chip step at S505, it is necessary to remove the factors other than the manufacturing factor of the chip, such as the inclination at the time of setting the document 110, and therefore, it is necessary to perform S505 after S502 to S504. That is, by the processing at S502 to S504 being performed, the error factor that remains is only the manufacturing inter-chip step. The derivation processing of the sub scanning direction magnification due to the inter-chip step is performed during the connecting position derivation processing at S506, but because of the reason described previously, details are omitted here.

The derivation method of the distance between the circular dot patterns in the present embodiment is the same as that in the fourth embodiment (FIG. 18). That is, in a case where the coordinates of A11 after conversion are taken to be A11' (0, 0), A12 is converted into A12' (x12', y12') and A21 into A21' (x21', y21'). At this time, x12'=x12−x11, y12'=y12−y11, x21'=x21−x11, and y21'=y21−y11 hold. In the case such as this, the inter-dot distance after the derivation processing of the inclination angle shown at S502 is in a relationship as shown in FIG. 28A to FIG. 28C.

In a case where the inclination of the chip is found to be $\varphi$ by the inclination angle derivation of the CIS 106 (S502), A12', A21' are converted into A12" (x12", y12"), A21" (x21", y21"), respectively, with the reference coordinates A11' being taken to be the origin. At this time, $x12"=x12'/\cos^{-1}\varphi$, $y12"=y12'+x12'/\tan\varphi$, $x21"=x21'/\cos^{-1}\varphi$, and $y21"=y21'+x21'/\tan\varphi$ hold.

<Derivation Processing of Inter-Chip Step>

Figure 29:
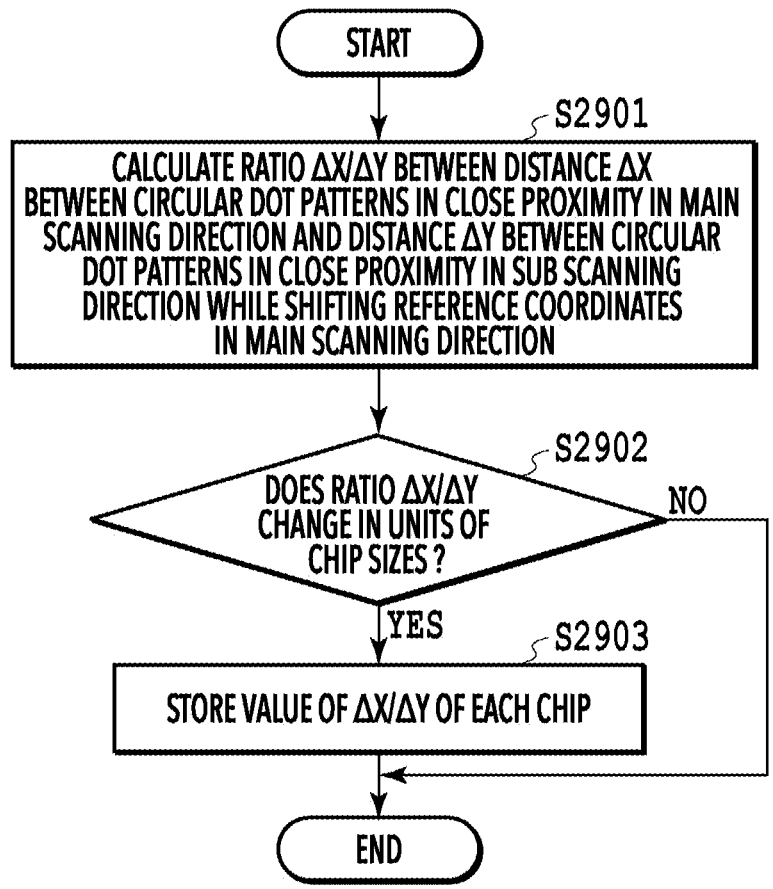
FIG. 29 is a flowchart of derivation processing of an inter-chip step in a seventh embodiment.

FIG. 29 is a flowchart showing a flow to derive the inter-chip step at S505 in FIG. 5.

First, at S2901, the CPU 204 calculates a ratio of $\Delta X/\Delta Y$ between a distance $\Delta X$ between circular dot patterns in close proximity in the main scanning direction and a distance $\Delta Y$ between circular dot patterns in close proximity in the sub scanning direction by using the relative converted coordinates described previously while shifting the reference coordinates in the main scanning direction.

Originally, the ratio $\Delta X/\Delta Y$ between the distance $\Delta X$ between circular dot patterns in close proximity in the main scanning direction and the distance $\Delta Y$ between circular dot patterns in close proximity in the sub scanning direction should be "R" (R≈1) without exception. However, in a case where there is an inter-chip step, the value changes between the nth $\Delta Xn/\Delta Yn$ and the (n+1)th $\Delta Xn+1/\Delta Yn+1$ and a numerical value smaller than "R" is calculated as a result.

For example, in a case where the configuration is designed so that the three circular dot patterns 401 described previously are arranged within one chip, by the first calculation, which corresponds to the inter-chip step, a value smaller than "R" is calculated and by the two calculations after this, "R" is calculated repeatedly. At S2902, the CPU 204 determines whether the repeated pattern such as this has been detected (in other words, whether the value of ΔX/ΔY changes in units of chip sizes). In a case where the results of the determination at this step are affirmative, the processing advances to S2903. On the other hand, in a case where the results of the determination at this step are negative, the detection of an inter-chip step is regarded as having failed and the processing is terminated. In a case where the detection has failed, it may also be possible to perform retry a predetermined number of times as needed.

At S2903, the ratio obtained by the first-time ΔX/ΔY calculation for each chip is stored in the memory 208.

It is possible to grasp in advance the circular dot pattern arranged at the position corresponding to the inter-chip step based on the positional relationship between the CIS 106 and the calibration chart. Consequently, it may also be possible to perform the calculation of the repeated value within the chip as the calculation performed only once for checking the accuracy of the detected value at the inter-chip step portion, or omit the calculation.

Figure 30A:
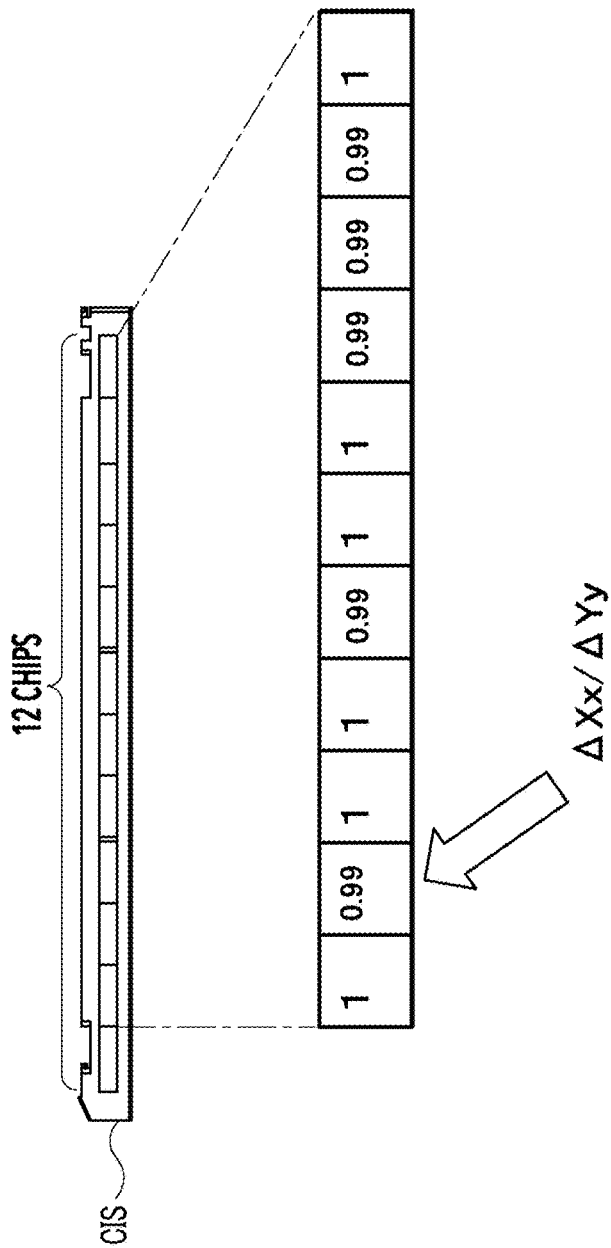
FIG. 30A and FIG. 30B are diagrams showing results of deriving the inter-chip step in the seventh embodiment.
Figure 30B:
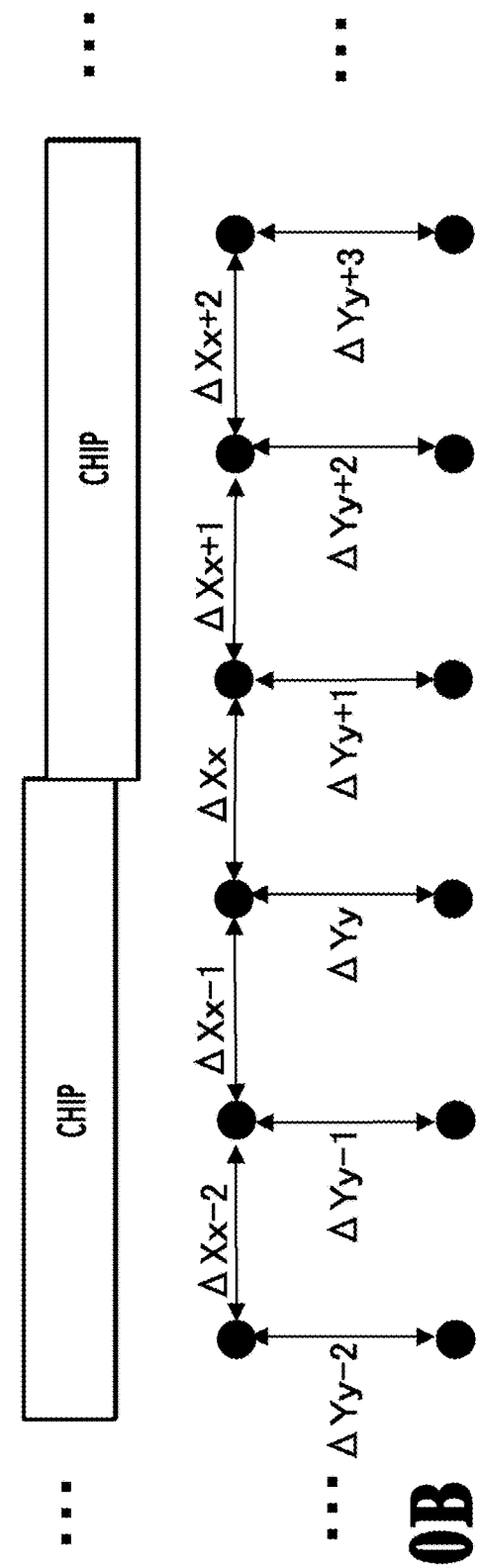

FIG. 30A and FIG. 30B show an example of the derivation results of the inter-chip step in the present embodiment. FIG. 30A is a schematic diagram showing a positional relationship between the CIS including 12 chips and the ratios stored in the memory 208 at S2903 described previously. In the case of FIG. 30A, the leftmost chip is taken to be the absolute reference, and therefore, the values for the 11 chips excluding the leftmost chip are stored. The value stored here is not the absolute amount for the leftmost chip but the relative amount for the (n−1)th chip.

FIG. 30B is a schematic diagram showing a relationship between two chips among the 12 chips shown in FIG. 30A and the circular dot patterns. As explained so far, each value of ΔXx−2/ΔYy−2, ΔXx−1/ΔYy−1, ΔXx+1/ΔYy+1, and ΔXx+2/ΔYy+2 derived by using the circular dot patterns for which reading is performed within the same chip is "R" (here, 1). On the other hand, as the value of ΔXx/ΔYy derived by using the circular dot patterns located across two chips, a value less than "R" (in this example, 0.99) is obtained in a case where there is an inter-chip step. The value that is stored in the memory 208 at S3003 is a value derived by using the circular dot patterns located across two chips, such as ΔXx/ΔYy in FIG. 30B.

In a case where this reading is performed actually, after temporarily storing the read image data in the memory 208, the absolute amount from the leftmost chip, that is, the inter-chip step amount is calculated based on the ratio stored at S2903 described previously and the image data is corrected in accordance with the value. By doing so, it is made possible to exclude the error factor in the main scanning direction due to the inter-chip step.

<Effects and the Like of the Present Embodiment>

It is also possible to apply the present embodiment to an image reading apparatus having only one CIS.

According to the present embodiment, it is made possible to implement correction in accordance with the inter-chip step without the need to improve the current manufacturing specifications. Consequently, it is made possible to implement highly accurate image reading.

Eighth Embodiment

<Problem of the Present Embodiment>

An object of the present embodiment is to make it possible to ignore the influence of the chart attachment error in the processing to detect misalignment in reading position in the sub scanning direction.

<Calculation of Magnification in Sub Scanning Direction>

The configuration of the scanner 100, the calibration processing, the processing to read the correction value calculation processing pattern and calculate the correction value, the derivation of the center coordinates of the circular dot pattern, and the derivation of the inclination angle of the CIS 106 in the present embodiment are the same as those in the first embodiment (see FIG. 1A to FIG. 10).

In a case where the calculation of the inclination angle of the CIS 106 is completed, following this, the derivation of the sub scanning direction magnification is performed. In the present embodiment, the derivation of the magnification in the sub scanning direction is substantially the same as that in the fourth embodiment (see FIG. 16 to FIG. 18) and the derivation of the main scanning direction magnification is the same as that in the seventh embodiment (see FIG. 28A to FIG. 28C).

Figure 16:
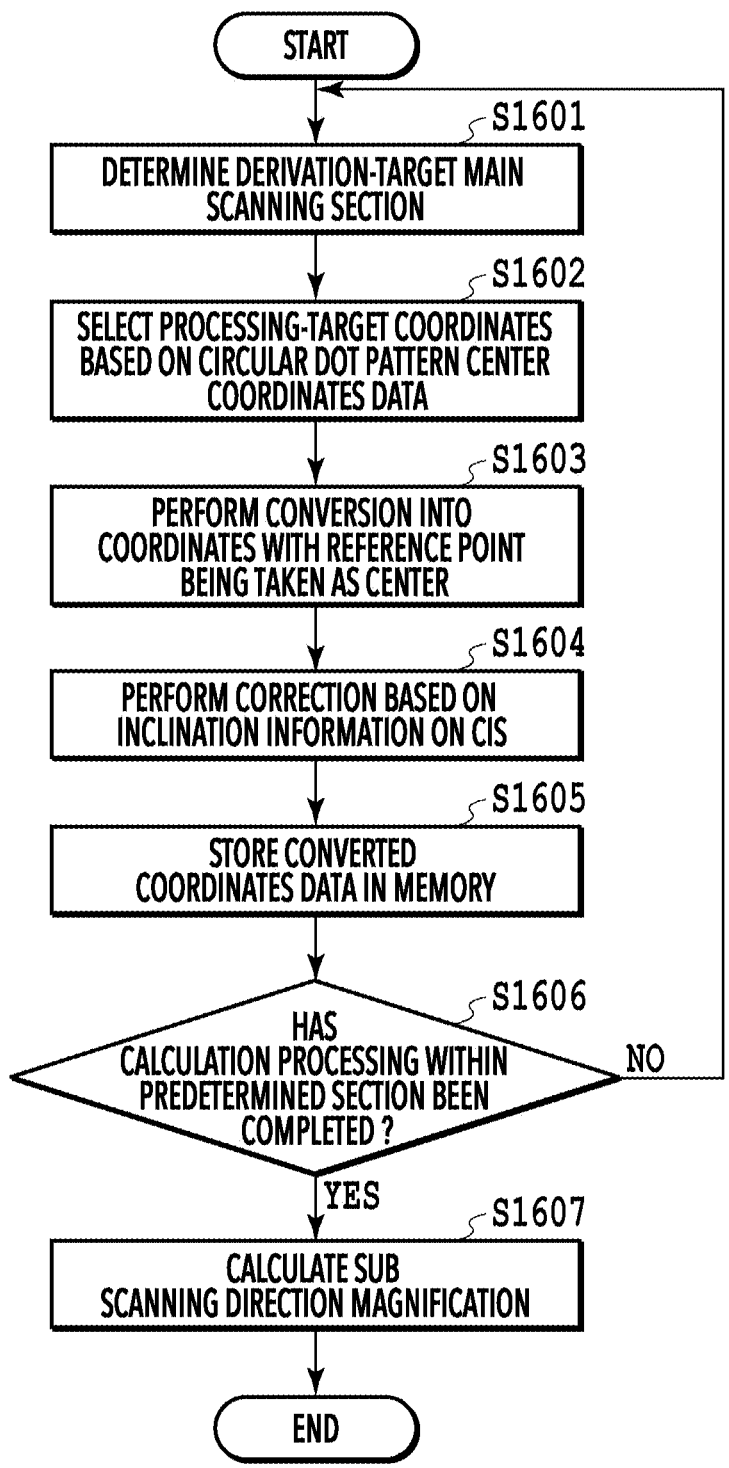
FIG. 16 is a flowchart of derivation processing of a sub scanning direction magnification in a fourth embodiment.

Here, explanation is given by taking a case where the pattern shown in (a) in FIG. 17 is read and the processing shown in FIG. 16 is performed. A length L in the sub scanning direction of the read pattern is calculated in accordance with formula (2) below in a case where the inter-dot distance on the pattern is taken to be D and the ideal sub scanning direction distance by which a document is conveyed by one rotation of the conveyance roller is taken to be F.

$$L = D \times N > F \times \cos \theta \max \quad \text{formula (2)}$$

At this time, N indicates the number (integer not less than 2) of dots corresponding to one period in the sub scanning direction and θ max indicates the maximum value of the inclination of the pattern with respect to the sub scanning direction, which may occur at the time of dot pattern reading. It is desirable for the inter-dot distance D to be D=F/(N−1) ideally. In this case, N dots are read in the sub scanning direction, and therefore, N pieces of data (nine pieces of data in the case of FIG. 17) are stored finally as the center coordinates data.

At S1606, the CPU 204 determines whether the center coordinates that can be selected as the reference point remain based on the stored center coordinates data. In a case where the results of the determination at this step are affirmative, the processing advances to S1607. On the other hand, in a case where the results of the determination at this step are negative (that is, in a case where the selectable center coordinates remain), the center coordinates of the circular dot pattern shifted in the sub scanning direction by an amount corresponding to one dot pattern from the center coordinates selected immediately previously as the reference point are selected.

For example, in a case where the center coordinates selected as the immediately previous reference point in the case of FIG. 17 is A11, A12 is selected as the next reference point in the sub scanning direction. As a result of repeatedly performing the processing at S1601 to S1606 in this manner, the center coordinates of A11 to A(N−1)1 are selected as the reference points and the distance to each distance-measuring point is calculated with the selected reference point being taken to be a center and stored in the memory. By A(N−1)1 being selected as the reference point, AN1 becomes the sub scanning distance-measuring point for A(N−1)1 and there is no data after that, and therefore, the processing is terminated. In a case where the distance data in all the sections is obtained, at S1607, the CPU 204 finds the sub scanning direction magnification a by reading the data from the memory. As described previously, it is possible to find the sub scanning direction magnification a by formula (1).

However, the denominator in formula (1) is the expectation value of the amount of conveyance and the numerator corresponds to the actual value of the amount of conveyance and in a case where the inclination of the pattern is supposed, the numerator is a value larger than the expectation value F of the amount of conveyance by the rotation corresponding to one circumference of the conveyance roller. Consequently, in order to lessen the influence of variation in each section due to the eccentricity of the conveyance roller, it is sufficient to correct the area exceeding the expectation value F of the amount of conveyance. To explain in detail, in the main scanning direction distance (that is, the denominator in formula (1)), in place of x(N−1)2″, $\Delta$x(N−1)2″=(F−x12″−x22″− . . . −x(N−2)2″)/x(N−1)2″ is added. Further, in the sub scanning direction distance (that is, the numerator in formula (1)), in place of yN1″, $\Delta$yN1″=yN1″×$\Delta$x(N−1)2″ is added.

One of the reasons that it is possible to calculate the sub scanning direction magnification a without taking into consideration the attachment inclination of the document 100 to the scanner 100 as described above is that the positional relationship of the center coordinates of the plurality of circular dot patterns does not change by the inclination of the pattern. In a case where the straight-line pattern as shown in FIG. 19A and FIG. 31B is used, a distortion occurs in the straight line due to the compound factors, such as the attachment inclination of the document 110 to the scanner 100, the inclination of the CIS 106, and the error in the amount of conveyance, and classification thereof becomes difficult.

Further, another reason is that the circular dot patterns are arranged with an angle of 90 degrees being provided in the main scanning direction and in the sub scanning direction with the reference point on the chart as a center, and therefore, the change in the ratio of the distances due to the inclination of the pattern is constant.

Consequently, by adopting the pattern of the present embodiment, it is made possible to find the sub scanning direction magnification with a high accuracy by a small number of pieces of simple calculation processing.

It is possible to reflect the sub scanning direction magnification obtained by the calculation of the present embodiment in the line reading start trigger generation timing, the enlargement/reduction correction in the image processing, and the like. For example, in a case of a reading apparatus whose conveyance motor is a stepping motor, it is sufficient to perform correction so as to generate a trigger for each rotation angle obtained by dividing the reference value of the motor rotation angle necessary to generate the line reading start trigger by the sub scanning direction magnification a. Further, in a case where the conveyance motor is a DC motor and the reading start trigger is generated by an encoder attached to the conveyance roller, it is sufficient to divide the reference value by the sub scanning direction magnification a for the encoder count value used for trigger generation.

<Effects and the Like of the Present Embodiment>

It is possible to apply the present embodiment to an image reading apparatus having only one CIS.

According to the present embodiment, it is made possible to ignore the influence of the chart attachment error in the processing to detect misalignment in reading position in the sub scanning direction.

Ninth Embodiment

In the present embodiment, a correction value for correcting a reading error due to the influence of eccentricity of the document conveyance roller is found. Specifically, the influence due to the eccentricity of the document conveyance roller refers to a variation in the amount by which a document is conveyed per unit rotation angle, which occurs in a case where the axis of the document conveyance roller misaligns slightly from the center due to the manufacturing tolerance. The amount of conveyance in the unit section may be large or small depending on the position and the amount of errors due to the eccentricity of the document conveyance roller will be zero in a case where the errors corresponding to one circumference of the roller are summed.

<Suppression of Influence Due to Eccentricity of Document Conveyance Roller>

Figure 32:
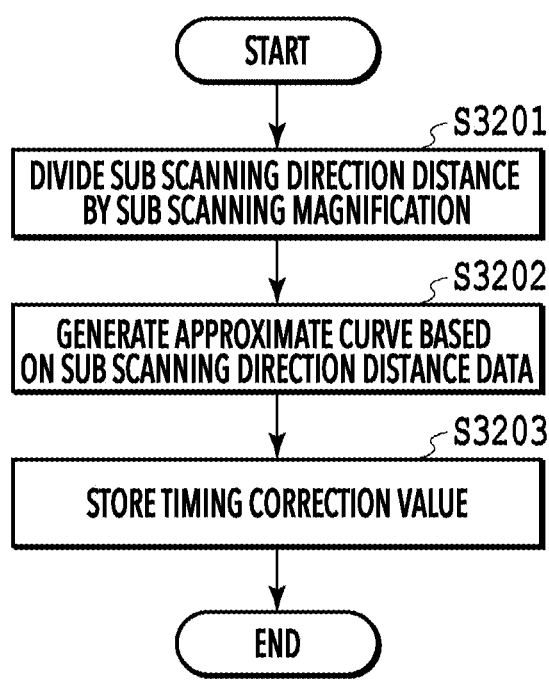
FIG. 32 is a flowchart of suppression processing of the influence of eccentricity in a ninth embodiment.

In the following, processing to suppress the influence due to the eccentricity of the document conveyance roller in the present embodiment is explained by using FIG. 32. FIG. 32 is a flowchart of a sub flow representing details of the suppression processing of the eccentricity influence at S504 in FIG. 5.

For the calculation of an error due to eccentricity, it is possible to use the sub scanning direction distance (y21″, y31″, . . . , yN1″) in the converted coordinates data used at the time of deriving the sub scanning direction magnification described previously. In a case where the sub scanning direction magnification is not derived in advance, before the flow in FIG. 32, by the flow of S1601 to S1606 in FIG. 16, the sub scanning direction distance after conversion is found. In the sub scanning direction distance obtained here, the amount corresponding to the variation due to the sub scanning direction magnification is also included. Consequently, at S3201, the CPU 204 divides all the sub scanning direction distances by the sub scanning direction magnification a. In a case where the sub scanning direction distances divided by the sub scanning direction magnification a are taken to be $\Delta$y2, $\Delta$y3, . . . , $\Delta$yN, $\Delta$yN is represented as yN1″/a ($\Delta$yN=yN1″/a).

Figure 33:
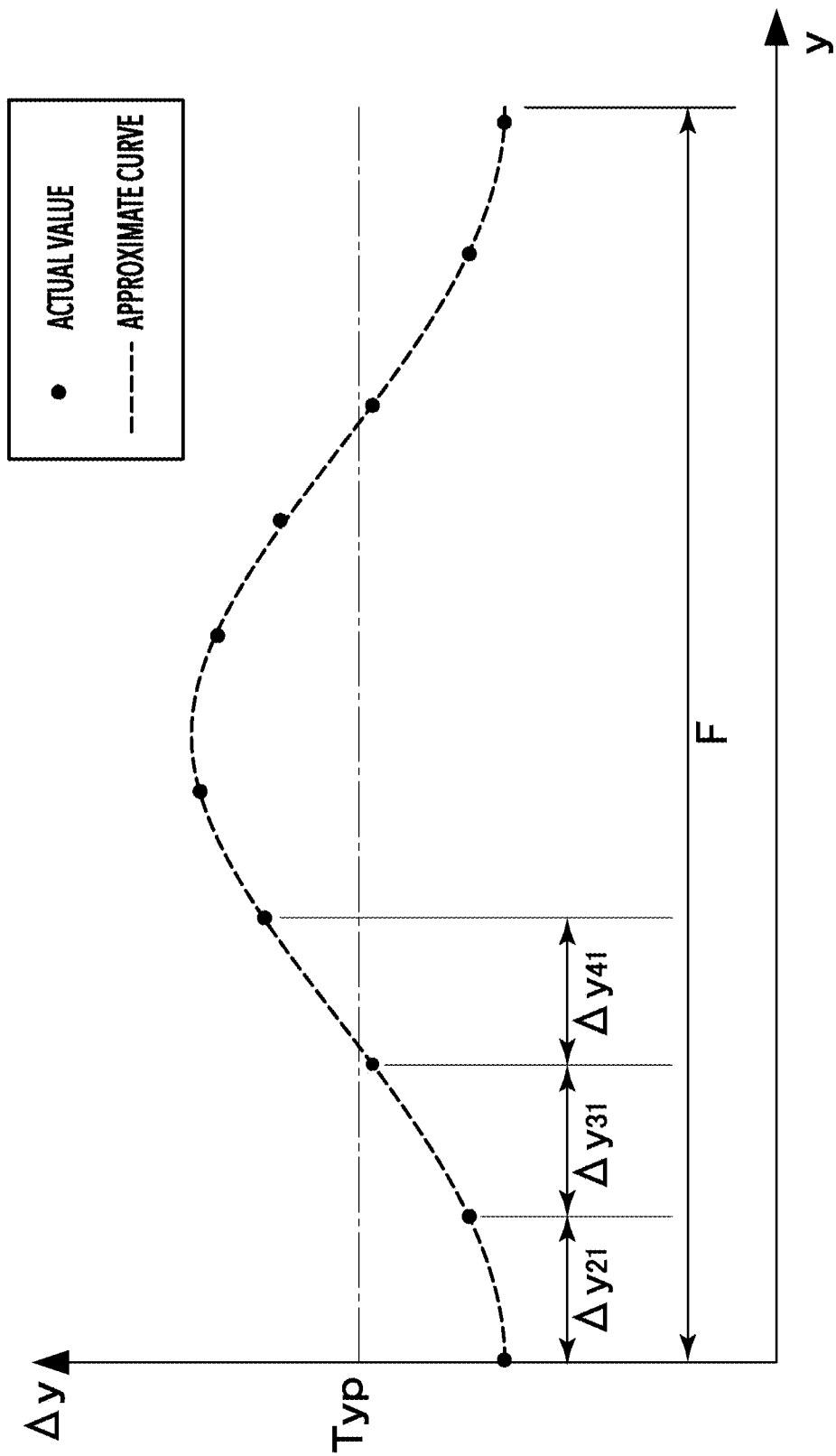
FIG. 33 is a diagram showing a relationship between an amount of conveyance Δy per unit section and an accumulated value y thereof.

At S3202, the CPU 204 takes this $\Delta$yN as the amount of conveyance per unit section and calculates an approximate curve with the vertical axis being taken to be the amount of conveyance $\Delta$y per unit section and the horizontal axis being taken to be the accumulated value y of $\Delta$y. By performing cumulative addition for all the sub scanning direction distances between dots included in the area whose amount of conveyance is larger than or equal to the amount of conveyance F corresponding to one circumference of the document conveyance roller and plotting the obtained values, for example, an approximate curve as shown by a broken line in FIG. 33 is obtained.

At S3203, the CPU 204 stores the timing correction value. By using the formula of the approximate curve obtained at S3202, it is made possible to obtain a correction value for correcting the reading start trigger generation timing of the line sensor at an arbitrary rotation angle of the document conveyance roller. In the memory of the scanner 100, a table for storing the timing correction value for the amount of conveyance of the unit section is stored and the timing correction value calculated at S3203 is stored in this table.

The timing correction data stored in the timing correction table is read at the time of the normal reading operation and used to finely adjust the line reading start trigger generation timing. As a result of this fine adjustment, for the section in which the amount of conveyance in the unit section is larger than a theoretical value, the line reading start trigger generation timing is advanced ahead of an initial value and for the section in which the amount of conveyance in the unit section is smaller than the theoretical value, the generation timing is delayed behind the initial value. Due to this, even in a case where there is a variation in the amount of conveyance due to the eccentricity of the document conveyance roller, the line reading period becomes constant, and therefore, it is possible to improve the reading quality.

<Effects and the Like of the Present Embodiment>

It is possible to apply the present embodiment to an image reading apparatus having only one CIS.

According to the present embodiment, it is possible to suppress the influence due to the eccentricity of the document conveyance roller, and therefore, it is possible to improve the reading accuracy.

In the present embodiment, for the sake of simplification of explanation, as shown in FIG. 33, the number of circular dot patterns to be read during conveyance corresponding to one circumference of the document conveyance roller is set to a small number. However, in order to improve the accuracy of correction, it is better to increase the number of patterns in the sub scanning direction to reduce the distance between patterns. However, in a case where the distance between patterns is short, the influence of an error at the time of distance calculation becomes large, and therefore, it is also possible to improve the accuracy by selecting a plurality of main scanning distance-measuring points and sub scanning distance-measuring points with the reference point being taken as a center and finding an average of distances, and so on.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is made possible to perform calibration in an image reading apparatus having a line image sensor with a high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-185971, filed Oct. 9, 2019, which is hereby incorporated by reference wherein in its entirety.

What is claimed is:

1. An image reading apparatus comprising:
    a line image sensor in which reading elements for reading an image are arrayed in a predetermined direction;
    a first derivation unit configured to, based on read data acquired by reading a chart on which a plurality of dot patterns is printed with the line image sensor, derive coordinates of each of the plurality of dot patterns;
    a second derivation unit configured to derive an inclination angle of the line image sensor based on the coordinates derived by the first derivation unit; and
    a first calculation unit configured to calculate a first correction value for correcting the inclination of the line image sensor based on the inclination angle derived by the second derivation unit, wherein
    on the chart, the plurality of dot patterns is arranged isolatedly from one another,
    the plurality of dot patterns includes at least one dot pattern group including one reference dot pattern and a plurality of peripheral dot patterns around the reference dot pattern, and
    the plurality of peripheral dot patterns is arranged so that a sum of coordinates from reference coordinates is zero in a case where coordinates of the reference dot pattern are taken to be the reference coordinates.

2. The image reading apparatus according to claim 1, wherein
    on the chart, at least the one dot pattern group is arranged for a width of a chip configuring the line image sensor.

3. The image reading apparatus according to claim 1, wherein
    on the chart, two or more of the dot pattern groups are arranged in a sub scanning direction for a circumferential length of a document conveyance roller.

4. The image reading apparatus according to claim 1, wherein
    the plurality of peripheral dot patterns is arranged concentrically with the reference coordinates being taken as a center.

5. The image reading apparatus according to claim 1, wherein
    on the chart, the dot pattern is arranged along a sub scanning direction for each circumferential length of a document conveyance roller.

6. The image reading apparatus according to claim 1, wherein
    the first calculation unit calculates the first correction value by performing straight-line approximation that takes the reference coordinates as a transit point.

7. The image reading apparatus according to claim 1, wherein
    each of the plurality of dot patterns is an approximate circle and the first derivation unit derives center coordinates of each of the plurality of dot patterns.

8. The image reading apparatus according to claim 1, further comprising:
    a second calculation unit configured to calculate a magnification in a sub scanning direction due to a diameter error of a document conveyance roller based on the read data and the first correction value.

9. The image reading apparatus according to claim 8, wherein
    the second calculation unit calculates a magnification in a sub scanning direction based on a distance in a main scanning direction between a reference point and a main scanning distance-measuring point, a distance in the sub scanning direction between the reference point and a sub scanning distance-measuring point, and an ideal distance in the sub scanning direction by which a document is conveyed in a case where a document conveyance roller makes one rotation.

10. The image reading apparatus according to claim 9, further comprising:
a fifth calculation unit configured to calculate a correction value for correcting reading start trigger generation timing of the line image sensor in accordance with a formula of an approximate curve obtained by plotting a value obtained by dividing a distance in a sub scanning direction in each section by a magnification in the sub scanning direction calculated by the second calculation unit.

11. The image reading apparatus according to claim 1, wherein
the line image sensor includes a plurality of chips and the image reading apparatus further comprises:
a third calculation unit configured to calculate ΔX/ΔY, which a ratio between a distance ΔX between dot patterns in close proximity in a main scanning direction and a distance ΔY between dot patterns in close proximity in a sub scanning direction while shifting reference coordinates in the main scanning direction; and
a fourth calculation unit configured to calculate an amount of misalignment of a read image between adjacent chips based on the calculated ΔX/ΔY.

12. The image reading apparatus according to claim 11, wherein
the distance between dot patters in close proximity on the chart is less than a width in the main scanning direction of the chip.

13. The image reading apparatus according to claim 11, wherein
the third calculation unit and the fourth calculation unit perform calculation for a dot pattern arranged at a position extending over the adjacent chips.

14. The image reading apparatus according to claim 1, comprising:
a plurality of the line image sensors, wherein
the plurality of line image sensors is arranged in a staggered pattern along a main scanning direction and
the image reading apparatus further comprises a sixth calculation unit configured to calculate an offset value indicating an amount of misalignment of a read image between line image sensors configuring an overlapping portion based on read data obtained by reading the chart at the overlapping portion of the line image sensors arranged in the staggered pattern.

15. The image reading apparatus according to claim 14, wherein
the sixth calculation unit calculates the offset value based on coordinates of each of the plurality of dot patterns and an inclination angle of each of the line image sensors.

16. The image reading apparatus according to claim 14, wherein
on the chart, at least two or more of the dot patterns are arranged along a main scanning direction for the overlapping portion.

17. The image reading apparatus according to claim 16, wherein the sixth calculation unit calculates the offset value by averaging values calculated for the at least two or more dot patterns.

18. The image reading apparatus according to claim 16, wherein
on the chart, sizes of the at least two or more dot patterns change depending on a position in a main scanning direction.

19. The image reading apparatus according to claim 16, wherein
on the chart, optical densities of the at least two or more dot patterns change depending on a position in a main scanning direction.

20. The image reading apparatus according to claim 14, wherein
on the chart, at least the one dot pattern is arranged for a chip overlapping portion at which chips configuring each line image sensor forming the overlapping portion of the overlapping portions overlap.

21. The image reading apparatus according to claim 14, wherein
on the chart, at least the two or more of the dot patterns are arranged along a sub scanning direction for a circumferential length of a document conveyance roller and
the sixth calculation unit calculates the offset value by averaging values calculated for the at least two or more dot patterns.

22. An image reading apparatus comprising:
a line image sensor in which reading elements for reading an image are arrayed in a predetermined direction;
a first derivation unit configured to, based on read data acquired by reading a chart on which a plurality of dot patterns is printed with the line image sensor, derive coordinates of each of the plurality of dot patterns;
a second derivation unit configured to derive an inclination angle of the line image sensor based on the coordinates derived by the first derivation unit; and
a first calculation unit configured to calculate a first correction value for correcting the inclination of the line image sensor based on the inclination angle derived by the second derivation unit, wherein
on the chart, the plurality of dot patterns is arranged isolatedly from one another,
the plurality of dot patterns includes at least one dot pattern group including one reference dot pattern and a plurality of peripheral dot patterns around the reference dot pattern, and
the plurality of peripheral dot patterns is arranged concentrically with the reference coordinates being taken as a center.

23. A control method of an image reading apparatus that includes a line image sensor in which reading elements for reading an image are arrayed in a predetermined direction, the control method comprising:
a first derivation step of, based on read data acquired by reading a chart on which a plurality of dot patterns is printed with the line image sensor, deriving coordinates of each of the plurality of dot patterns;
a second derivation step of deriving an inclination angle of the line image sensor based on the coordinates derived at the first derivation step; and
a first calculation step of calculating a first correction value for correcting the inclination of the line image sensor based on the inclination angle derived at the second derivation step, wherein on the chart, the plurality of dot patterns is arranged isolatedly from one another, the plurality of dot patterns includes at least one dot pattern group including one reference dot pattern and a plurality of peripheral dot patterns around the reference dot pattern, and the plurality of peripheral dot patterns is arranged so that a sum of coordinates from reference coordinates is zero in a case where coordinates of the reference dot pattern are taken to be the reference coordinates.

24. A non-transitory computer readable storage medium storing a program for causing a computer to perform a control method of an image reading apparatus that includes a line image sensor in which reading elements for reading an image are arrayed in a predetermined direction, the control method comprising:

a first derivation step of, based on read data acquired by reading a chart on which a plurality of dot patterns is printed with the line image sensor, deriving coordinates of each of the plurality of dot patterns;

a second derivation step of deriving an inclination angle of the line image sensor based on the coordinates derived at the first derivation step; and a first calculation step of calculating a first correction value for correcting the inclination of the line image sensor based on the inclination angle derived at the second derivation step, wherein on the chart, the plurality of dot patterns is arranged isolatedly from one another, the plurality of dot patterns includes at least one dot pattern group including one reference dot pattern and a plurality of peripheral dot patterns around the reference dot pattern, and the plurality of peripheral dot patterns is arranged so that a sum of coordinates from reference coordinates is zero in a case where coordinates of the reference dot pattern are taken to be the reference coordinates.

* * * * *